United States Patent
Levihn et al.

(10) Patent No.: US 11,243,532 B1
(45) Date of Patent: Feb. 8, 2022

(54) EVALUATING VARYING-SIZED ACTION SPACES USING REINFORCEMENT LEARNING

(71) Applicant: Apple Inc., Cupertino, CA (US)

(72) Inventors: Martin Levihn, San Jose, CA (US); Pekka Tapani Raiko, Finland (CH)

(73) Assignee: Apple Inc., Cupertino, CA (US)

( * ) Notice: Subject to any disclaimer, the term of this patent is extended or adjusted under 35 U.S.C. 154(b) by 613 days.

(21) Appl. No.: 16/143,124

(22) Filed: Sep. 26, 2018

Related U.S. Application Data

(60) Provisional application No. 62/564,165, filed on Sep. 27, 2017.

(51) Int. Cl.
| | |
|---|---|
| *G05D 1/00* | (2006.01) |
| *G06N 3/04* | (2006.01) |
| *G05D 1/02* | (2020.01) |
| *G06N 3/08* | (2006.01) |

(52) U.S. Cl.
CPC ......... *G05D 1/0088* (2013.01); *G05D 1/0221* (2013.01); *G05D 1/0291* (2013.01); *G06N 3/0454* (2013.01); *G06N 3/08* (2013.01); *G05D 2201/0213* (2013.01)

(58) Field of Classification Search
None
See application file for complete search history.

(56) References Cited

U.S. PATENT DOCUMENTS

| | | |
|---|---|---|
| 8,531,293 B2 | 9/2013 | Putz |
| 8,605,947 B2 | 12/2013 | Zhang et al. |
| 8,706,298 B2 | 4/2014 | Goulding |
| 8,903,588 B2 | 12/2014 | Schmudderich et al. |
| 8,912,978 B2 | 12/2014 | Szczerba et al. |
| 10,345,447 B1 | 7/2019 | Hicks |
| 10,394,243 B1 | 8/2019 | Ramezani et al. |
| 10,482,572 B2 | 11/2019 | Hotson et al. |
| 2010/0191391 A1 | 7/2010 | Zeng |
| 2010/0228476 A1 | 9/2010 | Bar-Zeev et al. |
| 2010/0253493 A1 | 10/2010 | Szczerba et al. |
| 2010/0253539 A1 | 10/2010 | Seder et al. |
| 2011/0190972 A1 | 8/2011 | Timmons et al. |
| 2013/0210405 A1 | 8/2013 | Whipple et al. |
| 2014/0064624 A1 | 3/2014 | Kim et al. |
| 2016/0096270 A1* | 4/2016 | Ibarz Gabardos ....... B25J 9/161 700/253 |

(Continued)

OTHER PUBLICATIONS

U.S. Appl. No. 15/988,929, filed May 24, 2018, Juergen Wiest.

(Continued)

*Primary Examiner* — Truc M Do

(74) *Attorney, Agent, or Firm* — Robert C. Kowert; Kowert, Hood, Munyon, Rankin & Goetzel, P.C.

(57) ABSTRACT

A set of actions corresponding to a particular state of the environment of a vehicle is identified. A respective encoding is generated for different actions of the set, using elements such as distinct colors to distinguish attributes such as target lane segments. Using the encodings as inputs to respective instances of a machine learning model, respective value metrics are estimated for each of the actions. One or more motion-control directives to implement a particular action selected using the value metrics are transmitted to motion-control subsystems of the vehicle.

20 Claims, 13 Drawing Sheets

(56) References Cited

U.S. PATENT DOCUMENTS

| | | |
|---|---|---|
| 2016/0174902 A1 | 6/2016 | Georgescu et al. |
| 2017/0166487 A1 | 6/2017 | Lazur |
| 2018/0120843 A1 | 5/2018 | Berntorp et al. |
| 2018/0173240 A1* | 6/2018 | Fang ................. B60W 50/0097 |
| 2018/0345958 A1 | 12/2018 | Lo et al. |
| 2019/0049970 A1 | 2/2019 | Djuric et al. |
| 2019/0346854 A1 | 11/2019 | Slutsky et al. |
| 2019/0353778 A1 | 11/2019 | Slutsky et al. |

OTHER PUBLICATIONS

David I. Shuman, et al., "The Emerging Field of Signal Processing on Graphs", IEEE, IEEE Signal Processing Magazine, May 2013, pp. 83-98.

Joan Bruna, et al., "Spectral Networks and Deep Locally Connected Networks on Graphs", arXiv:1312.6203V3, May 21, 2014, pp. 1-14.

Thomas N. Kipf, et al., Semi-Supervised Classification with Graph Convolutional Networks, arXiv:1609.02907v4, Feb. 22, 2017, pp. 1-14.

Michaël Defferrard, et al., "Convolutional Neural Networks on Graphs with Fast Localized Spectral Filtering", arXiv:1606.09375v3, Feb. 5, 2017, pp. 1-9.

Adam Santoro, et al., "A simple neural network module for relational reasoning", arXiv: 1706.01427v1, Jun. 5, 2017, pp. 1-16.

Vincenzo Di Massa, et al., "A Comparison between Recursive Neural Networks and Graph Neural Networks", The 2006 IEEE International Joint Conference on Neural Network Proceedings, IEEE, 2006, pp. 1-8.

Bryan Perozzi, et al., "DeepWalk: Online Learning on Social Representation", arXiv: 1403.6652v2, Jun. 27, 2014, pp. 1-10.

Franco Scarselli, et al., "The graph neural network model", 2009, University of Wollongong Australia, IEEE Transactions on Neural Networks, vol. 20, No. 1, pp. 61-80.

David Duvenaud, et al., "Convolutional Networks on Graphs for Learning Molecular Fingerprints", arXiv: 1509.09292v2, Nov. 3, 2015, pp. 1-9.

Yujia Li, et al., "Gated Graph Sequene Neural Networks", arXiv: 1511.05943v3, May 3, 2016, Published in ICLR 2016, pp. 1-20.

Peter Ondruska, et al., "End-to-End Tracking and Semantic Segmentation Using Recurrent Neural Network", arXiv:1604.05091, 2016, pp. 1-9.

Yichuan Tang, et al., "Learning Stochastic Feedforward Neural Networks", Advances in Neural Information Processing Systems, 2013, pp. 1-9.

Shaosheng Cao, et al., "Deep Neural Networks for Learning Graph Representations", Proceedings of the Thirtieth AAAI Conference on Artificial Intelligence (AAAI-16), pp. 1145-1152.

Max Jaderberg, et al., "Reinforcement Learning with Unsupervised Auxiliary Tasks", arXiv: 1611.05397v1, Nov. 16, 2016, pp. 1-14.

Isaac Dykeman, "Conditional Variational Autoencoders", Retrieved from http://ijdykeman.github.io/ml/2016/12/21/cvae.html on Mar. 16, 2017, pp. 1-12.

Diederik P. Kingma, et al., "Auto-Encoding Variational Bayes", arXiv: 1312.6114v10, May 1, 2014, pp. 1-14.

Heiga Zen, et al., "Deep Mixture Density Networks for Acoustic Modeling in Statistical Parametric Speech Synthesis", 2014 IEEE international conference on acoustics, speech and signal processing (ICASSP). IEEE, 2014, pp. 1-5.

Werner Uwents, et al., "A Comparison between Neural Network Methods for Learning Aggregate Functions", International Conference on Discovery Science. 2008, pp. 88-99.

Alberto Testolin, et al., "Probabilistic Models and Generative Neural Networks: Towards on Unified Framework for Modeling Normal and Impaired Neurocognitive Functions", Frontiers in Computational Neuroscience, Jul. 2016, vol. 10, Article 73, pp. 1-9.

Dietmar Kasper, et al., "Object-Oriented Bayesian Networks for Detection of Lane Change Maneuvers", Intelligent Transportation Systems Magazine, vol. 4, No. 1, Jan. 2012, pp. 1-10.

Wikipedia, "Mixture distribution", Retrieved from https://en.wikipedia.org/wiki/Mixture_distribution on Mar. 16, 2017, pp. 1-8.

Wikipedia, "Multi-task learning", Retrieved from https://en.wikipedia.org/wiki/Multitask_learning on Mar. 20, 2017, pp. 1-11.

Christopher M. Bishop, "Mixture Denisty Networks", Feb. 1994, Neural Computing Research Group Report: NCRG/94/004, pp. 1-26.

Kihyuk Sohn, et al., "Learning Structured Output Representation using Deep Conditional Generative Models", Advances in neural information processing systems. 2015, pp. 1-9.

Caglar Gulceher, et al., "Learned-Norm Pooling for Deep Feedforward and Recurrent Neural Networks", arXiv: 1311.1780v7, Sep. 2, 2014, pp. 1-17.

Julie Dequaire, et al., "Deep Tracking on the Move: Learning to Track the World from a Moving Vehicle using Recurrent Neural Networks", xrXiv: 1609.09365v2, Feb. 9, 2017, pp. 1-8.

Eike Rehder, et al., "Goal-Directed Pedestrian Prediction", Proceedings of the IEEE International Conference on Computer Vision Workshops. 2015, pp. 50-58.

Carl Doersch, "Tutorial on Variational Autoencoders", arXiv: 1606.059082v2. Aug. 13, 2016, pp. 1-23.

U.S. Appl. No. 16/143,117, filed Sep. 26, 2018, Martin Levihn.

Ziyu Wang, et al., "Dueling Network Architectures for Deep Reinforcement Learning", arX2v: 1511.06581V3, Apr. 5, 2016, pp. 1-15.

Volodymyr Minh, et al., "Human-level control through deep reinforcement learning", Macmillan Publishers Limited, copyright 2015, Feb. 26, 2015, vol. 518, Nature, pp. 529-541.

Wikipedia, "Q-learning", Retrieved from https://en.wikipedia.org/wiki/Q-learning on Aug. 27, 2017, pp. 1-5.

David Silver, et al., "Matering the game of Go with Deep Neural Networks and Tree Search", Retrieved from https://github.com/tpn/pdfs/blob/master/Mastering%20the%20Game%20of%20Go%20with%20Deep%20Neural%20Networks%20and%20Tree%20Search.pdf on Aug. 31, 2017, pp. 1-63.

\* cited by examiner

EVALUATING VARYING-SIZED ACTION SPACES USING REINFORCEMENT LEARNING

This application claims benefit of priority to U.S. Provisional Application No. 62/564,165 filed Sep. 27, 2017, which is hereby incorporated by reference in its entirety.

BACKGROUND

Technical Field

This disclosure relates generally to systems and algorithms for reasoning, decision making and motion planning with respect to controlling the motion of autonomous or partially autonomous vehicles.

Description of the Related Art

Motorized vehicles which are capable of sensing their environment and navigating to destinations with little or no ongoing input from occupants, and may therefore be referred to as "autonomous" or "self-driving" vehicles, are an increasing focus of research and development. Until relatively recently, due to the limitations of the available hardware and software, the maximum speed at which computations for analyzing relevant aspects of the vehicle's external environment could be performed was insufficient to enable non-trivial navigation decisions to be made without human guidance. Even with today's fast processors, large memories, and advanced algorithms, however, the task of making timely and reasonable decisions (which are based neither on excessively pessimistic assumptions, nor on excessively optimistic assumptions) regarding an autonomous vehicle's trajectory in the context of unpredictable behaviors of other entities (such as other drivers or other autonomous vehicles) and incomplete or noisy data about static and dynamic components of the vehicle's environment remains a significant challenge.

SUMMARY OF EMBODIMENTS

Various embodiments of methods and apparatus for evaluating varying-size action spaces for autonomous vehicles using neural network-based reinforcement learning models are described. According to some embodiments, a method may comprise determining a representation of the current state of the environment of an autonomous or partially-autonomous vehicle at various points in time during a journey. The method may also include identifying, with respect to the current state, a corresponding set of feasible or proposed actions which can be undertaken. For example, in one embodiment, data captured using various sensors of the vehicle may be processed locally at a behavior planner decision-making component of the vehicle and combined with map information to determine the current state and the feasible actions. The set of feasible or proposed actions, which may be described at a relatively high level of abstraction during this stage of decision making, such as "turn left into target lane segment <LS-k> and move at target velocity <T> behind <other-observed-vehicle OV1>", may be state-dependent in various embodiments—that is, the number and types of different feasible actions may differ from one state to another. As such, the size of the action space to be evaluated at the vehicle may vary as the vehicle's state changes during the course of a journey. In some states, such as when the vehicle is traveling on a largely-empty straight highway with no turns possible for several kilometers or miles, the number of actions to be evaluated may be relatively small; in other states, as when the vehicle approaches a crowded intersection, the number of actions may be much larger.

Each of the actions may comprise a number of different constituent attributes or properties in various embodiments, such as an origin/source lane segment (the lane segment in which the vehicle is located at the time the actions are evaluated), a target lane segment (the lane segment in which the vehicle will be located if the action is implemented), a target velocity in the target lane segment, positioning relative to one or more other vehicles or objects, and so on. The decision-making components of the vehicle may be responsible for evaluating the different feasible actions in a given state relative to one another, selecting one of the actions for implementation, transforming the abstract representation of the selected action into a detailed motion plan, and issuing directives to the lower-level motion control subsystems of the vehicle (e.g., the acceleration subsystem, turning subsystems etc.) to implement a trajectory corresponding to the selected action. In at least some embodiments, multiple instances or executions of a reinforcement learning model may be employed at the vehicle to obtain respective value metrics for the actions, and the value metrics may be used to select the action to implement.

In at least some embodiments, deep neural network based machine learning models (such as convolutional neural network models trained using graphical or image inputs) may be employed as the reinforcement learning models. In some embodiments, the method may comprise generating a respective encoding for individual ones of the feasible actions and/or for the current state. In various embodiments, at least some attributes or properties of the actions and/or states may be encoded using image-based or graphical signals (such as colors, icons and the like), and the encodings may therefore sometimes be referred to as graphical encodings. In the encoding, respective elements (such as distinct colors used for representing the source and target lane segments) or channels may be used to represent the different attributes or properties of the actions and/or the current state. Encodings which include at least some graphical elements may represent examples of multi-channel encodings or multi-signal encodings in formats suitable for input to a neural network, in which respective visually distinguishable signals or channels (such as distinct colors, sizes of icons, positioning of icons, etc.) are used to represent at least some of the different aspects or properties of the input state and action combination. One or more non-graphical elements (such as scalar numeric values for representing speeds) may be included in the inputs to the machine learning models (e.g., together with the graphical encodings of other attributes) in some embodiments. Thus, in some embodiments, machine learning models used to identify suitable actions to take may be provided two types of input data: graphical encodings of some action/state attributes, as well as non-graphical representations of other action/state attributes. In other embodiments, the graphical encodings and the non-graphical representations may be combined into a single aggregated data object or meta-encoding for use as input to an instance of a machine learning model. In at least one embodiment, a machine learning model (e.g., a deep reinforcement learning neural network) used for evaluating actions may be trained to take a representation or encoding of a combination of the current state and a particular feasible action as input, and to produce a single estimated value metric (which may be referred to as a Q-value) for the combination as its output. The method may comprise executing multiple instances of such a model in some embodiments, and obtaining respective value metrics for respective actions from the multiple instances. For example, if four actions a1, a2, a3 and a4 are to be evaluated with respect to a given state s, four instances of the model may be executed in some embodiments. Respective encodings of (s, a1), (s, a2), (s, a3) and (s, a4) may be provided as input data sets to the four instances, and respective estimated value metrics Q(s, a1), Q(s, a2), Q(s, a3) and Q(s, a4) may be obtained from the instances. The estimated value metrics may be used to select a particular action for implementation: e.g., if Q(s, a3) corresponds to the highest of the four value metrics in the above example, a3 may be chosen for implementation. The method may further comprise transmitting, from the decision making components of the vehicle to a lower-level motion-control subsystem of the vehicle, one or more motion-control directives to implement the selected action.

As and when the number of actions to be evaluated changes, more instances (or fewer instances) of the machine learning model may be executed, thereby enabling the decision making components to handle varying sized action spaces easily. In at least one embodiment, at least some of the instances of the model may be run in parallel, e.g., using one or more graphical processing units (GPUs) set up for decision-making and/or other types of computations at the vehicle. In such embodiments, as long as sufficient parallelizable computing resources are available to permit the execution durations of the different instances to overlap substantially, the total time taken to evaluate the set of feasible actions may not change very much as the cardinality of the set (the number of distinct actions to evaluate) changes.

Any of a number of factors or parameters contributing to a reward function for an action may be taken into account when estimating the value metric in different embodiments. Such factors may, for example, include progress towards a destination of the journey, a probability of avoiding a collision of the vehicle, an extent to which a set of traffic rules is obeyed by the vehicle, a comfort level of one or more occupants of the vehicle, and/or an anticipated social interaction of an occupant of the vehicle with one or more individuals outside the vehicle.

In some embodiments, instead of or in addition to using multiple instances of a single reinforcement learning model, the task of estimating the Q(s, a) value associated with a given state and action combination may be accomplished using at least two types of models. One of these types of models, of which only a single instance may be required, may take an encoding of a state alone (as opposed to an encoding of a state and an action) as input, and may produce estimates of the value associated with the input state assuming that the currently-in-use policy for selecting actions remains in effect. The second type of model, of which multiple instances (with the number of instances being equal to the number of actions being evaluated) may take (state, action) encodings as input, and produce an estimate of the advantage associated with a given action as output. In effect, the value metric Q(s, a) may be logically subdivided into two parts in such embodiments as follows: $Q(s, a) = V(s) + A(s, a)$. In this formulation, $V(s)$ (estimated using the first type of model) is a metric associated with a state, intuitively indicating how valuable or good the state is, given the current action selection policy, while $A(s, a)$ (which may be estimated, along with Q(s, a), using the second type of model) is indicative of the relative goodness or value of each action. (The Q function itself indicates the overall value of choosing a particular action in a given state.) The estimated V values may be combined with the respective A values to obtain the Q(s, a) values in some embodiments. During training iterations of the model used for estimating Q, value updates may be computed the output of the model used for estimating V in some embodiments. In at least one embodiment, the V estimates may also be used during the processing of planning trees representing various possible (state, action) sequences by a behavior planner—e.g., some states may be eliminated from further analysis based at least on part on their V estimates.

According to some embodiments, a system may comprise one or more computing devices. The computing devices may identify, corresponding to a state of an environment of a vehicle, a set of proposed or feasible actions. The feasible actions may differ from one another in several different dimensions or attributes, such as target lane segments, speeds, relative positioning with respect to other vehicles, etc. The computing devices may generate respective encodings of various actions, using various elements such as colors, icons, and the like to represent the different dimensions or properties of the actions. The computing devices may determine, using a plurality of instances of a machine learning model, a respective estimated value metric associated with individual actions of the set of feasible actions. The input data sets of respective instances may comprise encodings of the respective actions of the set; for example, if there are N feasible actions to evaluate, N instances of the model may be run, with respective encodings of the N actions being included in the input data sets for the instances. The computing devices may transmit, to a motion-control subsystem of the vehicle, one or more motion-control directives to implement a particular action of the set, with the particular action being selected based at least in part on its estimated value metric.

According to at least one embodiment, a non-transitory computer-accessible storage medium may store program instructions that when executed on one or more processors cause the one or more processors to identify, corresponding to a state of an environment of a vehicle, a set of proposed actions. The feasible actions may differ from one another in several different dimensions or properties, such as target lane segments, speeds, relative positioning with respect to other vehicles, etc. The instructions when executed may cause the one or more processors to generate respective encodings of various actions, using various elements such as distinct colors for target lane segments versus source lane segments. The instructions when executed may determine, using a plurality of instances of a machine learning model, a respective estimated value metric associated with individual actions of the set of feasible actions. A particular action may be selected for implementation based at least partly on its estimated value metric. One or more motion-control directives may be transmitted to motion control subsystem of the vehicle to implement the selected action.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
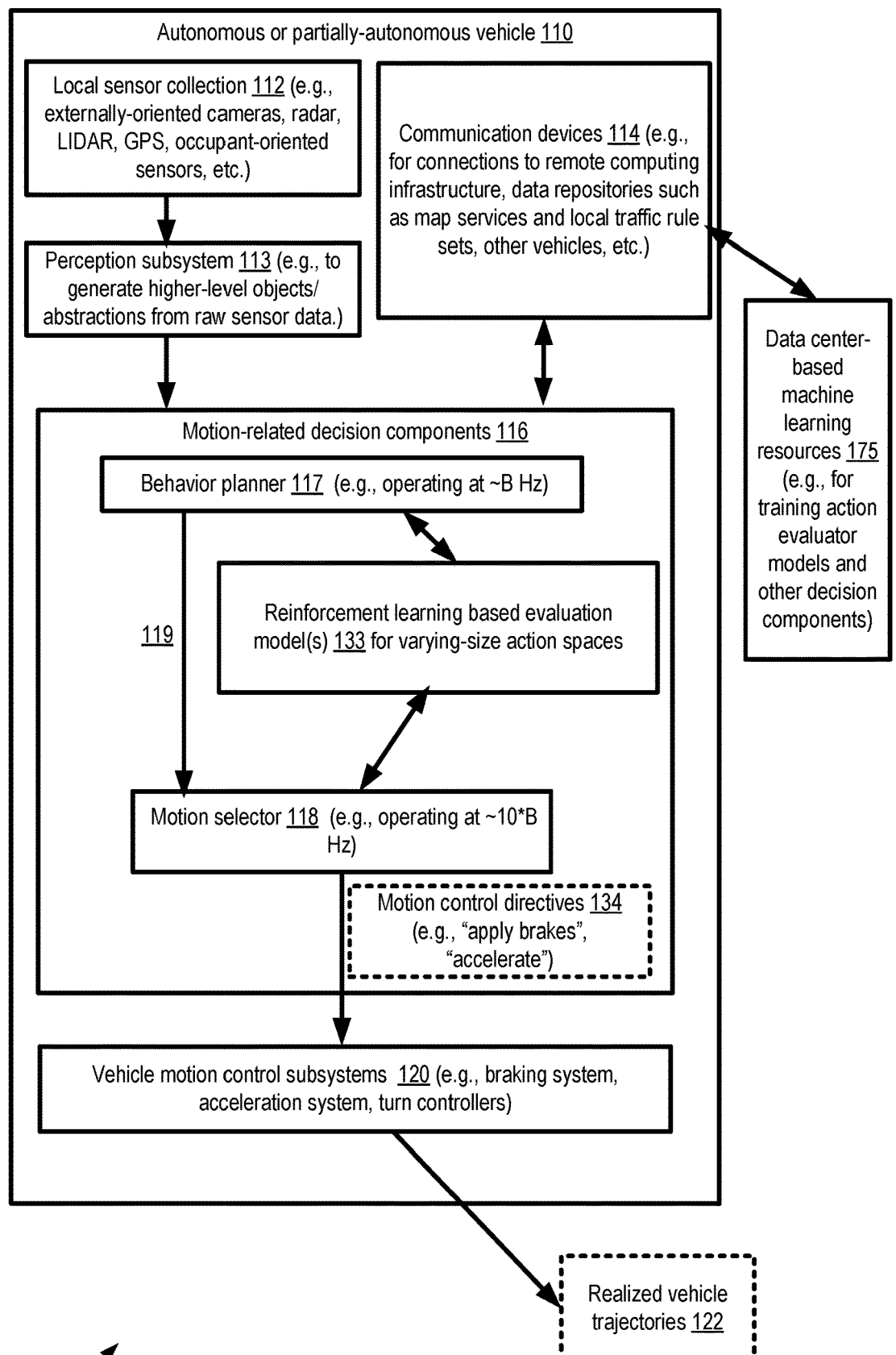
FIG. 1 illustrates an example system environment in which varying-size action spaces may be evaluated using a reinforcement learning model to help direct the movements of a vehicle, according to at least some embodiments.

FIG. 1 illustrates an example system environment in which varying-size action spaces may be evaluated using a reinforcement learning model to help direct the movements of a vehicle, according to at least some embodiments. As shown, system 100 comprises an autonomous or partially-autonomous vehicle 110. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's decision making components, or even disable the vehicle's decision making components at least temporarily; furthermore, in at least one embodiment, a decision-making component of the vehicle may request or require an occupant to participate in making some decisions under certain conditions. Vehicle 110 may comprise several categories of components in the embodiment depicted in FIG. 1: motion-related decision making components 116, local sensor collection 112, perception subsystem 113, motion control subsystems 120 and communication devices 114. The decision making components 116 may comprise multiple tiers or layers in the depicted embodiment, including but not necessarily limited to a behavior planner 117 and a motion selector 118. In the depicted embodiment, one or more of the decision making components 116 may comprise or utilize machine learning models which are generated or trained at least in part using data center-based machine learning resources 175. As shown, the behavior planner 117 and/or motion selector 118 may utilize one or more reinforcement-learning based evaluation models 133, designed to handle variable sized action spaces, in some embodiments.

According to some embodiments, at various points in time during the course of a journey of the vehicle 110, one or more decision making components 116 (such as the behavior planner 117) may determine the current state of the environment of the vehicle (e.g., its current location and speed, the locations and speeds of other vehicles or objects, and so on). For example, the state may be determined based at least in part on data collected at a local sensor collection 112 and processed at the perception subsystem 113. Corresponding to any given state, a set of feasible or proposed actions may be identified (e.g., by the behavior planner 117 in the depicted embodiment). A given action may be described or represented using a combination of numerous attributes or dimensions, such as a target lane segment which the vehicle may enter, a target speed in that lane segment, relative positioning with respect to other vehicles in the target lane segment (e.g., a position ahead of or behind another vehicle) and so on.

In the depicted embodiment, a respective encoding comprising multiple channels or signals of information may be constructed for individual ones of the actions, and used as part of the input data set provided to an evaluation model 133. In some embodiments, respective graphical elements such as colors, icon sizes, positions of icons etc., incorporated for example within an approximate bird's-eye-view representation of the vehicle's vicinity, may be used to distinguish one action from another. For example, if one of two lane segments LS1 and LS2 may be selected as the next lane segment to be occupied by the vehicle in respective actions A1 and A2, a depiction of LS1 may be colored green in the A1 encoding with LS2 being colored grey, while the colors assigned to the LS1 and LS2 depictions may be reversed in A2's encoding (i.e., in the A2 encoding LS1 may be colored grey while LS2 is colored green). Using a similar approach, an encoding of the current state may also be generated, with respective elements such as icons and colors being used to represent various facets or attributes of the state such as positions and velocities of different vehicles. In some embodiments, combinations of graphical and non-graphical elements may be used to represent the attributes of actions and/or states—for example, speed values may be represented numerically instead of using graphical elements. It is noted that although, in much of the following description, the graphical or visual aspects of the model inputs are discussed most frequently, the described techniques of using reinforcement learning models to process varying-sized action spaces may be applied regardless of the extent to which graphical versus non-graphical elements are used for representing attributes of the actions or states.

For each of the different actions to be evaluated in a given state, in some embodiments a corresponding encoding of the (state, action) pair may be included in the input data set provided to a respective instance of the reinforcement learning model 133. The output of the model may comprise a respective value metric for the (state, action) pair in various embodiments. The following formulation may be used to represent the operation of the model. In formulation (1), Q(s, a) (which may be referred to as a Q-value) represents the value metric associated with taking the action a from current the state s, in accordance with the action-selection policy in effect at the vehicle.

$$(s,a) \rightarrow Q(s,a) \tag{1}$$

For example in one embodiment, the Q(s, a) values may be scalar numeric values, with a high Q value representing a higher expected reward. The value metrics estimated for the different actions may be compared to one another select a particular action for implementation in various embodiments. Corresponding to the selected action, a more concrete or detailed motion plan may be identified, e.g., by the motion selector 118 in the depicted embodiment. One or more motion-control directives 134 to implement a motion plan corresponding to the selected action may be transmitted to the vehicle's motion control subsystems 120.

In the depicted embodiment, the motion control subsystems 120, such as a braking system, acceleration system, turn controllers and the like may collectively be responsible for causing various types of movement changes (or maintaining the current trajectory) of vehicle 110, e.g., in response to directives or commands issued by the motion selector 118 and/or the behavior planner 117 with the help of models 133, resulting in the actual or realized trajectory 122. In the tiered approach towards decision making illustrated in FIG. 1, the motion selector 118 may be responsible for issuing relatively fine-grained motion control directives 134 to various motion control subsystems. The rate at which directives are issued to the motion control subsystems 120 may vary in different embodiments—for example, in some implementations the motion selector 118 may issue one or more directives approximately every 100 milliseconds, which corresponds to an operating frequency of about 10 Hertz for the motion selector 118. Of course, under some driving conditions (e.g., when a cruise control feature of the vehicle is in use on a straight highway with minimal traffic) directives to change the trajectory may not have to be provided to the motion control subsystems at some points in time. For example, if a decision to maintain the current velocity of the vehicle is reached by the decision making components using models 133, and no new directives are needed to maintain the current velocity, the motion selector may not issue new directives every T milliseconds even though it may be capable of providing such directives at that rate.

The motion selector 118 may determine the content of the directives to be provided to the motion control subsystems (i.e., whether braking to slow speed by X units is required, whether acceleration by Y units is required, whether a turn or lane change is to be implemented, etc.) based on several inputs in the depicted embodiment, including conditional action and state sequences generated by the behavior planner 117 (as indicated by arrow 119), data obtained from sensor collection 112 via perception subsystem 113, and/or value estimates generated for various actions using models 133. The term "world state" may also be used to refer to the domain over which a set of predictions are generated at the decision making components 116 in various embodiments. In at least some embodiments, the world state may include a tactical map, representations of the states of various other moving entities (e.g., nearby vehicles, some of which may also be autonomous or semi-autonomous) as well as stationary objects that could potentially impact the decisions to be made regarding the movements of vehicle 110. In one embodiment, the reinforcement learning based evaluation models 133 may not necessarily be bundled with the behavior planner 117 and/or the motion selector 118 as part of a decision-making subsystem; instead, the evaluation models 133 may be considered another example of an input source for the decision-making subsystem. In some embodiments, the architecture of the decision making subsystem may differ from that shown in FIG. 1—e.g., instead of separate behavior planner and motion selector subcomponents, a single motion planner (which utilized the results generated by the evaluation models 133) may be used.

According to at least some embodiments, the task of generating model(s) 133 to be used for action evaluation may involve several phases, some of which may be performed continuously or in parallel with others. For example, in various embodiments, data indicating static components of the environment at thousands or millions of locations, data pertaining to the driving behavior of agents controlling vehicles (which may include human drivers as well as autonomous driving systems) under a wide variety of circumstances and external driving conditions, and so on, may be collected over months or years or on an ongoing basis, forming a potentially very large input data set for successive iterations of machine learning model improvements. Respective portions of such data may be in various formats—e.g., in the form of videos or still images collected from on-vehicle cameras or stationary cameras outside vehicles, output from LIDAR (light detection and ranging) devices, radar and other types of local sensors, sensors attached to the vehicle motion control subsystems to capture braking, acceleration and turning patterns, global positioning devices, location sensors based on wi-fi or other signals, and so on. Data may also be collected from various databases such as law repositories for various jurisdictions in which autonomous vehicles are expected to operate, map repositories, accident report databases, motor vehicle or road management departments of governments, and so on. In some embodiments, one or more simulation models of the behaviors of various entities, including autonomous vehicles and other entities, may be constructed with the help of the collected data and used during training of the models to be used for action evaluation.

After a model 133 has been trained and evaluated, e.g., using data center based resources 175, it may be deployed for execution at one or more autonomous vehicles 110 in the depicted embodiment. In some embodiments, a subset of the model's parameters may be left open or un-finalized at the time of deployment to an autonomous vehicle fleet; values for such parameters may be determined at the autonomous vehicle itself. At the vehicle, input collected from local sensors 112 and communication devices 114 may be provided to the model(s) 133 (as well as to other decision making components such as the behavior planner 117 and motion selector 118). The output value metrics of the model(s) 133 may be used at the motion selector and/or the behavior planner to generate motion control directives 134 (such as the logical equivalents of commands to "apply brakes" or "accelerate") in the depicted embodiment, which may be transmitted to the vehicle motion control subsystems 120 to achieve or realize desired movements or trajectories 122. It is noted that in one embodiment, at least a portion of one or more models used for action evaluation may be trained at the autonomous vehicle itself, e.g., without requiring resources at remote data centers to be utilized.

Inputs may be collected at various sampling frequencies from individual sensors of the vehicle's sensor collection 112 in different embodiments via an intermediary perception subsystem 113 by the behavior planner 117, the motion selector 118 and/or the action space evaluation models 133. The perception subsystem may generate higher-level objects or abstractions derived from the raw sensor data in various embodiments, which may be more appropriate for analysis by the decision components than the raw sensor data itself. In one embodiment, an intermediary perception subsystem 113 may not be required. Different sensors may be able to update their output at different maximum rates in some embodiments, and as a result the rate at which the output derived from the sensors is obtained at the various decision making components may also vary from one sensor to another. A wide variety of sensors may be included in collection 112 in the depicted embodiment, including externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices and so on. In addition to conventional video and/or still cameras, in some embodiment near-infrared cameras and/or depth cameras may be used. In one embodiment, one or more of the communication devices 114 may also play the role of a sensor—e.g., signals regarding the state and/or plans of other autonomous or non-autonomous vehicles in the vicinity may be collected via any appropriate communication protocol.

In one approach used for managing the movements of vehicle 110, the behavior planner 117 may generate relatively longer-term plans comprising sequences of conditional actions and states which may be reached as a result of the actions, and provide the alternatives together with associated value metrics (e.g., indicating the "relative goodness" of the alternatives based on currently-known information) to the motion selector 118. The plans may be provided at a slower rate to the motion selector 118 than the rate at which directives 134 are expected to be provided to the control subsystems 120 in some embodiments (the slower rate may result, for example, from the amount of computations which have to be performed to generate the alternatives). As shown in the example of FIG. 1, the ratio of the operating frequencies of the motion selector 118 and the behavior planner 117 may be approximately 10:1 in some embodiments (e.g., if the rate at which updated action sequences are provided to the motion selector is approximately B Hertz, the rate at which directives are to be provided to the motion control subsystems may be approximately 10*B Hertz). Other frequency ratios may be used in different embodiments—the ratio shown in FIG. 1 is provided as an example and is not intended to be limiting. In some embodiments, the behavior planner 117 may utilize one or more Monte Carlo Tree Search (MCTS) algorithms to generate the plans to be provided to the motion selector. MCTS is an approach for decision making, sometimes used in automated game player systems, which combines the generality of random simulation with the precision of tree search algorithms often employed in machine learning systems. In at least one embodiment, output obtained from the action space evaluation model(s) 133 may be used during the tree searches, e.g., to prune various sub-trees and so on.

In some embodiments, at least some of the computations involved in behavior planning and/or motion selection at driving time of the autonomous vehicle 110 may be performed using remote resources. The communication devices 114 (which may comprise hardware and/or software components used for wireless or telephony-based communication channels of any appropriate types) may be used to transmit and receive the data corresponding to such remote operations, to obtain updates to the models 133 and so on. The extent to which decision making is performed locally versus remotely may vary over time in some embodiments—e.g., if communication with a remote facility becomes difficult or unavailable, more decisions (of potentially lower complexity or duration) may be generated locally temporarily, until communication quality is restored. In one embodiment, regardless of whether decisions are generated at least in part locally or not, the communication devices 114 may be used to transmit data about the vehicle's state (and/or local actions taken in various states) to a remote data repository, where the data may later be analyzed and utilized to enhance the model(s) 135 or 137 and/or other decision components 116.

Figure 2:
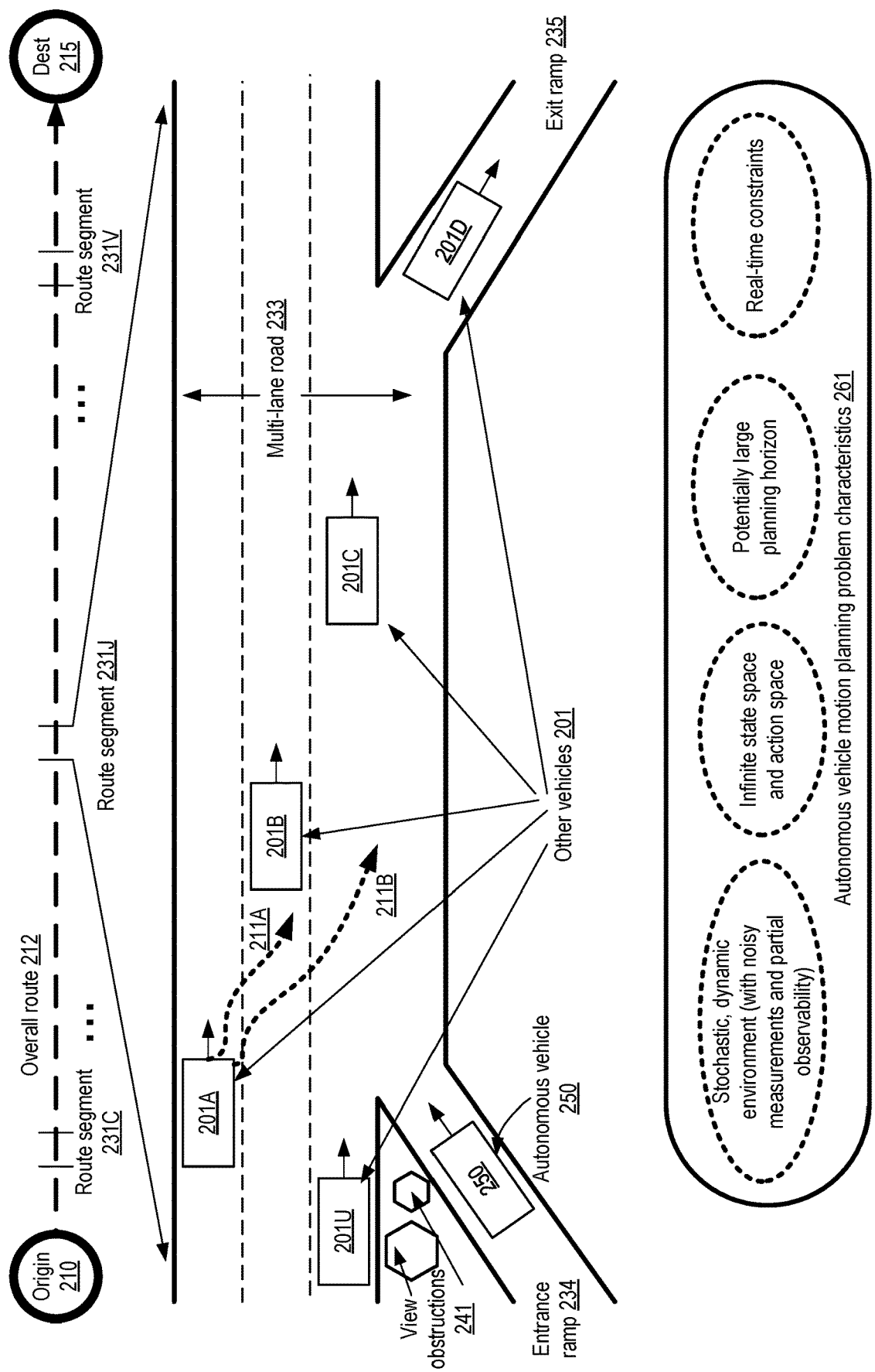
FIG. 2 illustrates an example decision making scenario for an autonomous vehicle, as well as general problem characteristics associated with such decision making scenarios, according to at least some embodiments.

FIG. 2 illustrates an example decision making scenario for an autonomous vehicle, as well as general problem characteristics associated with such decision making scenarios, according to at least some embodiments. A high-level overall route 212 for an autonomous vehicle 250 from an origin 210 to a destination 215 (labeled "Dest" in FIG. 2) may be identified prior to the start of a journey. The high-level route 212 may, for example, be identified using a network-accessible mapping service, and may comprise information such as a proposed set of highways/roads, the exits and entrances to be used for the highways/roads, and so on. In some cases the high-level route 212 may also comprise an estimated or targeted arrival time at the destination 215. The route 212 may comprise numerous sub-portions or route segments 231, such as segments 231C, 231J and 231V. A given segment 231 may represent, for example, an entrance or turn onto some road or highway, some driving distance on the road or highway, and so on.

In the depicted example, route segment 213J comprises the use of an entrance ramp 234 by autonomous vehicle to merge into a multi-lane road 233 (the dashed lines indicate lane boundaries). An exit ramp 235 is located within a short distance of the entrance ramp 234 in the example. The entrance ramp 234, exit ramp 235 and various portions of the multi-lane road may be modeled as lane segments of a tactical map in various embodiments, which may be used to identify possible actions. A number of other vehicles 201 (of which zero or more may be autonomous vehicles), such as vehicles 201A, 201B, 201C, 201D and 201U may be using the road 233 at or just before vehicle 250 is to enter the road, and may be close enough to the entrance ramp to be considered pertinent to the motion decisions made for vehicle 250. The general directions of motion of the vehicles 201 and 250 are indicated by the arrows—e.g., most of the vehicles shown are assumed to be generally proceeding from left to right in the view shown in FIG. 2. The decisions which need to be made with respect to autonomous vehicle 250 may include, for example, the speed at which the road should be entered, how long the vehicle 250 should remain in any given lane immediately after entering the road, whether and to what extent the vehicle's speed should be changed after the entrance, and so on.

Although experienced human drivers may find these kinds of decisions fairly straightforward to make, the task of automating such decisions in a timely and safe manner may be complicated. The general problem of making motion-related decisions for the autonomous vehicle may be summarized as follows. Given some level of understanding or knowledge about the "world" (the nearby static and dynamic environment of the vehicle 250, as well as the properties of the vehicle's current position and movements), and given information about the destination 215 (including the high-level route 212), the decision making components of the vehicle 250 may be required to produce a sequence of trajectories for the vehicle that (a) arrive at the destination safely in a timely and efficient manner (e.g., meeting some desired fuel or battery usage targets), (b) are dynamically feasible (e.g., comply with various applicable physical laws), (c) follow traffic rules, and (d) provide a comfortable experience for the vehicle's occupants. In order to achieve such goals, in at least some embodiments neural network-based models of the kind discussed in the context of FIG. 1 may be used to forecast future states of the world at selected time horizons.

A number of problem characteristics 261 which tend to make the decision making for autonomous vehicles challenging are indicated in FIG. 2. First, the dynamically changing environment of vehicle 250 may be inherently stochastic rather than deterministic, with noisy rather than full and accurate data (such as velocity, position, or heading) available with respect to other vehicles 201 and other relevant objects (such as debris in the road, potholes, signs, etc.). In some cases, one or more objects 241 may partially block a view of the road. As a result, one or more vehicles such as 201U may be partially or fully unobserved during the time period in which the merge-related decisions for vehicle 250 may have to be made. Furthermore, the intentions or goals of other agents (e.g., the drivers of vehicles 201, or the decision making components of those vehicles 201 which happen to be automated vehicles) may be unknown and difficult to predict. For example, even if the current position and velocity of vehicle 201A is known, the agent controlling vehicle 201A may suddenly change vehicle 201A's trajectory to a different lane, as indicated by arrows 211A and 211B, and such a transition may affect the decisions made on behalf of autonomous vehicle 250. Second, many of the metrics or observations which may need to be considered when making the decisions, such as the velocities and relative distances between various vehicles, their relationships to nearby elements of the infrastructure or environment, and so on, may take on continuous rather than discrete values, resulting in a theoretically infinite feasible space of possible states and actions.

The number of sequential actions which may need to be planned may be quite large (even when the actions are represented at a fairly high level of abstraction), resulting in potentially large planning horizons. In principle, to achieve optimal decisions (where the definition of optimality may itself be non-trivial), individual actions and corresponding achievable states may have to be evaluated relative to one another with respect to the goals of the journey, and such comparisons may become computationally intractable depending on the number of alternatives being considered at each stage. Finally, because the vehicle 250 is moving, with a high (and therefore potentially dangerous) level of kinetic energy, the decisions may have to be made within tight real-time constraints, using limited computational resources. These characteristics, taken together, may make motion planning for autonomous vehicles an extremely difficult proposition.

Figure 3:
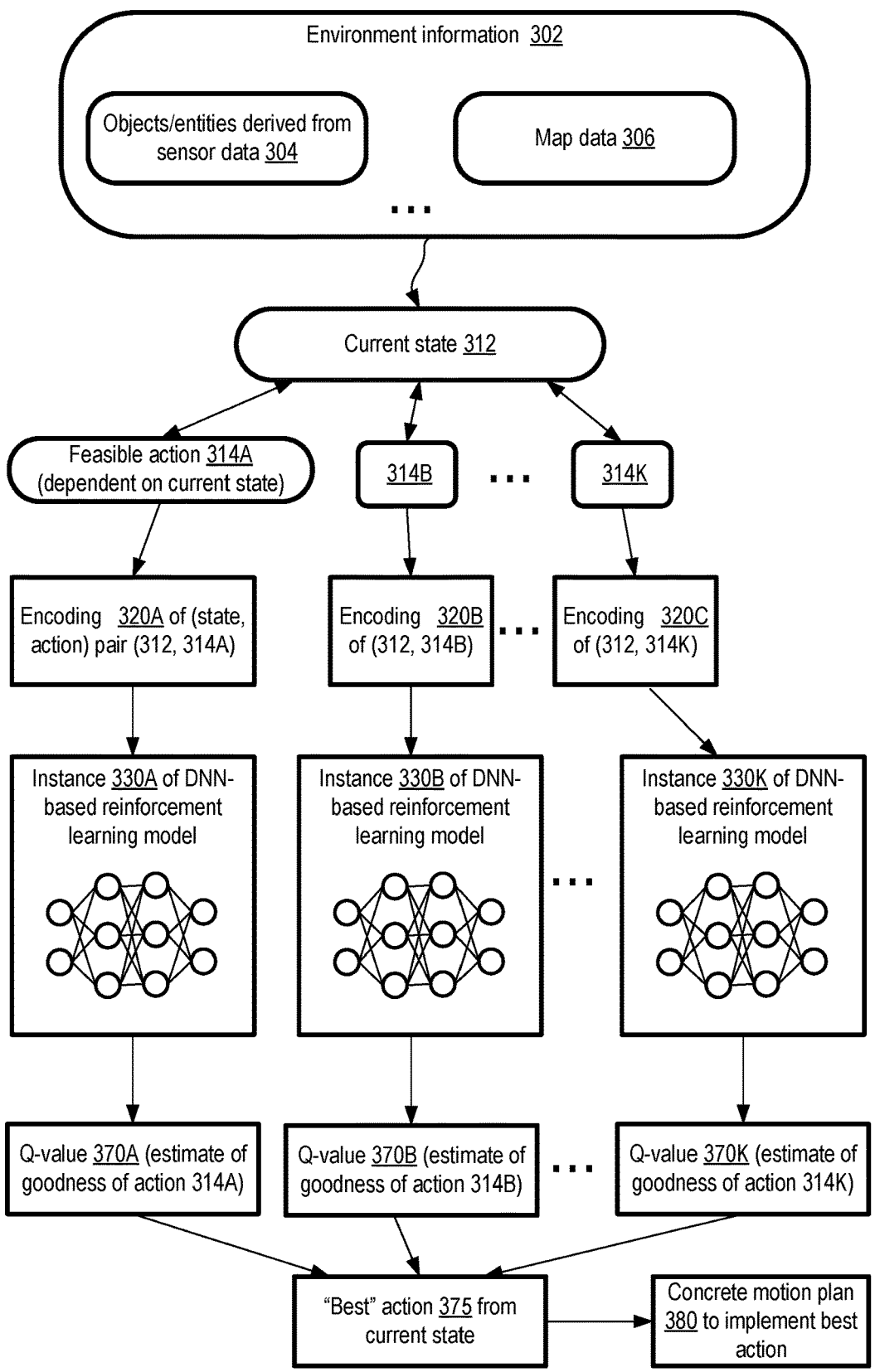
FIG. 3 illustrates an example overview of the analysis of multiple feasible actions with respect to a given state of an autonomous vehicle using a reinforcement learning model, according to at least some embodiments.

FIG. 3 illustrates an example overview of the analysis of multiple feasible actions with respect to a given state of an autonomous vehicle using a reinforcement learning model, according to at least some embodiments. In the depicted embodiment, at least two types of information 302 pertaining to the environment of a vehicle may be used to determine its current state 312 at the decision making components of the vehicle. Raw input collected via a variety of sensors (e.g., similar to the sensors of local sensor collection 112, discussed in the context of FIG. 1) may be processed (e.g., using a perception subsystem similar to subsystem 113 of FIG. 1) to generate representations 304 of nearby objects and entities. In addition, in at least some embodiments, map data 306 may be obtained or stored at the vehicle, and such map data may be used in combination with the sensor-derived data to generate a descriptor of the current state 312.

A set of feasible actions 314 given the current state 312, such as action 314A, 314B and 314K, may be identified at the decision making components in the depicted embodiment. As such, the set of actions which are to be evaluated may change as the current state changes. A respective encoding 320 (e.g., encodings 320A-320K, which may be at least partially graphical in various embodiments) may be generated at the decision-making components for each of the (state, action) combinations {(312, 314A), (312, 314B), . . . , (312, 314K)}. In some implementations, separate encodings (e.g., including respective sets of pixels) of the state and the actions may be generated, with respective channels or elements such as colors, icons, etc. being used for different attributes/properties of the actions to distinguish one action from another. In other implementations, a single aggregated encoding may be generated which represents various dimensions or attributes of the state as well as an action. In at least one implementation, as mentioned above, non-graphical elements may be used for representing at least some aspects of the state, action, or combination—e.g., text strings or numeric values may be generated to represent one or more of the attributes of the actions and/or the state.

The encodings of the (state, action) pairs may be included in the input data sets of respective instances 330 (such as instances 330A-330K) of a trained deep neural network based reinforcement learning model which has been deployed at the vehicle in the depicted embodiment. The different instances 330 may be executed at least partly in parallel with one another in some embodiments, e.g., using GPU-based devices (or other computing devices supporting parallelism) incorporated within the vehicle. Each of the instances or executions of the model may generate a quality metric termed a Q-value 370 in the depicted embodiment, indicative of the goodness of the corresponding action given the current state and one or more reward functions associated with vehicle trajectories anticipated to be achieved as a result of implementing the actions. In some embodiments, at least some of the computations of the model instances may be performed using resources that are not incorporated within the vehicle itself—e.g., resources at data centers may be used. In at least one embodiment, at least some instances may not be executed in parallel with one another.

Decision-making components of the vehicle may compare the quality metrics or Q-values 370 associated with the different actions, and identify the "best" action 375 given the current set of information available, based at least in part on the quality metrics. After the best action is selected, a concrete motion plan 380 may be generated to implement the action, and corresponding directives may be sent to the motion-control subsystems of the vehicle.

Figure 4:
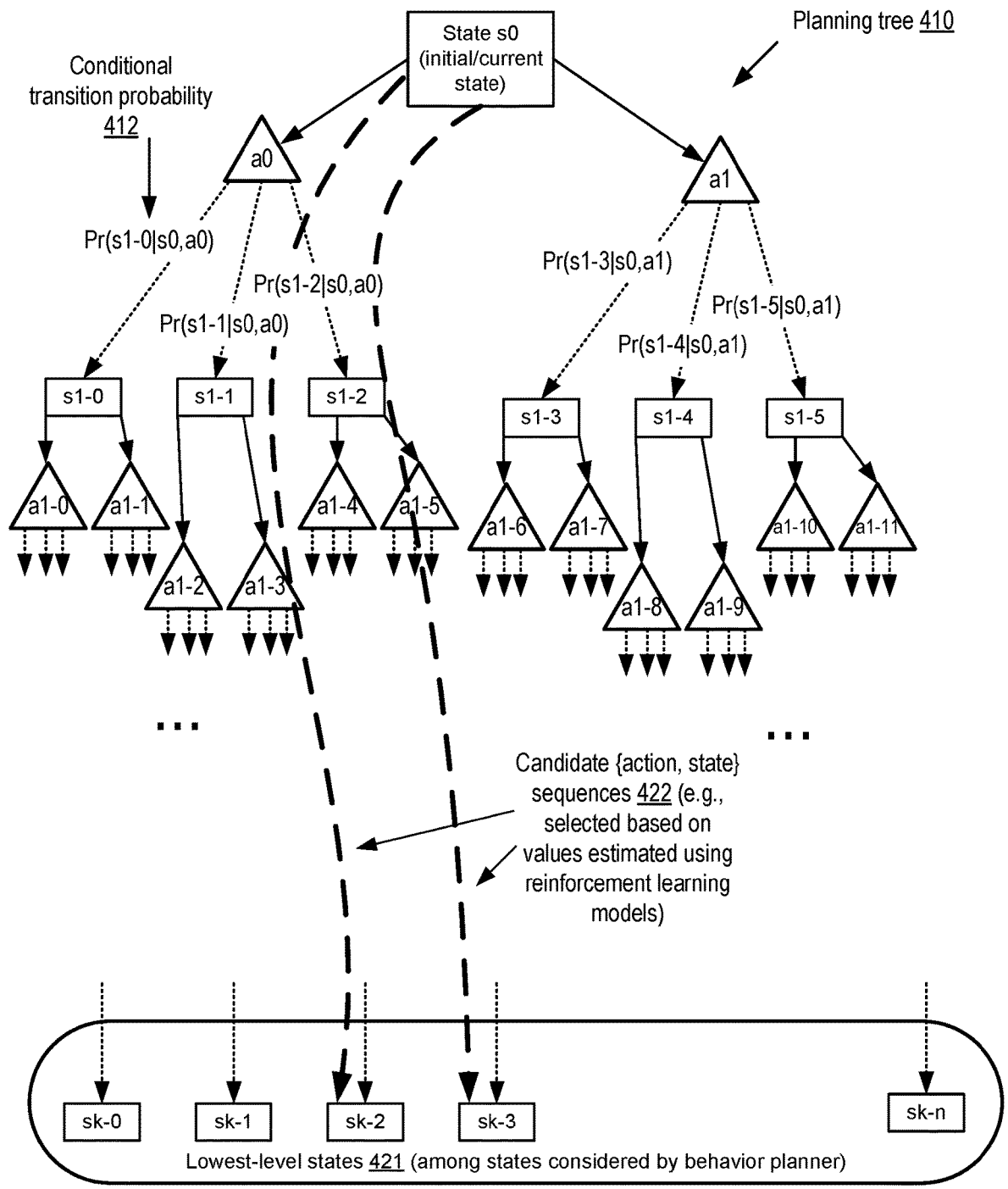
FIG. 4 illustrates an example of a planning tree which may be processed using a reinforcement learning model at a behavior planner of an autonomous vehicle, according to at least some embodiments.

In the discussion above, reinforcement learning models were used to evaluate possible actions with respect to the current state of the vehicle. In some embodiments, as part of its responsibilities for longer-term planning, a decision-making component such as a behavior planner may use similar reinforcement learning models for searches of tree data structures in which numerous states and corresponding sets of feasible actions may be represented. FIG. 4 illustrates an example of a planning tree which may be processed using a reinforcement learning model at a behavior planner of an autonomous vehicle, according to at least some embodiments.

As shown, planning tree 410 may comprise two types of nodes in the depicted embodiment: state nodes (with labels such as s0, s1-0, etc.), and action nodes (with labels such as a0, a1-0, etc.). Such trees may also be referred to in some embodiments as Expectimax search trees. At a given point of time at which planning tree 410 is being constructed by a behavior planner, the current or initial state of the autonomous vehicle's world may be represented by the node labeled s0. A number of actions may be feasible from the initial state, each of which may lead to one of several next states with respective transition probabilities. That is, the edges between a source state and other "next-states" which may result from the implementation of an action may each indicate the probability of reaching that state, given the source state and the action. To reduce clutter, a trivial example in which each two actions are considered for each state, and in which each action may result in one of three next states, is shown in FIG. 4. In real-world scenarios, the respective fan-outs from state nodes and action nodes may be significantly different (e.g., greater) than those shown in FIG. 4. Furthermore, in at least some embodiments, the fan outs may differ for different state nodes, for different action nodes, or at different levels within the tree. The fan-outs, as well as the number of levels of the tree, may be considered tunable or optimizable parameters of the decision-making procedure in various embodiments.

A traversal down the tree from the root node s0 to one of the lowest-level states 421 (sk-0, sk-1, sk-n) for which decision-making is being performed forms a candidate sequence (such as one of the pair of sequences labeled 422) of conditional actions and states which may be selected for transmission to a motion selector in some embodiments. Consider, for example, the set of possible next states included in tree 410 if action a0 is implemented from initial state s0. The notation Pr(s1-0|s0,a0) represents the conditional transition probability 411 of reaching state s1-0, given starting state s0 and action a0. Similarly, Pr(s1-1|s0,a0) represents the probability of reaching state s1-1, given starting state s0 and action a0, and so on. Depending on the planning horizon (which corresponds roughly to the depth of tree 410, that is, the number of levels between s0 and lowest-level states 421) and the fan-outs from the action and state nodes, the total amount of computation required for constructing a complete planning tree may be quite high in various embodiments. The behavior planner may use several types of optimizations when constructing planning trees such as 410 and when evaluating action and state sequences relative to one another in various embodiments. In some embodiments, reinforcement learning models similar to those discussed above may be used, for example, to prune the trees by limiting the number of actions to consider from a given state, or to reduce the number of states to consider as consequences of a given action. Monte Carlo search tree algorithms may be utilized, e.g., together with other algorithms for limiting tree searches with respect to breadth and depth, in some embodiments. In at least one embodiment as discussed in the context of FIG. 10, a neural network model that is specifically designed to generate value metrics for states (as opposed to value metrics for state-action combinations) may be used to help make tree construction and/or search more efficient.

Figure 5:
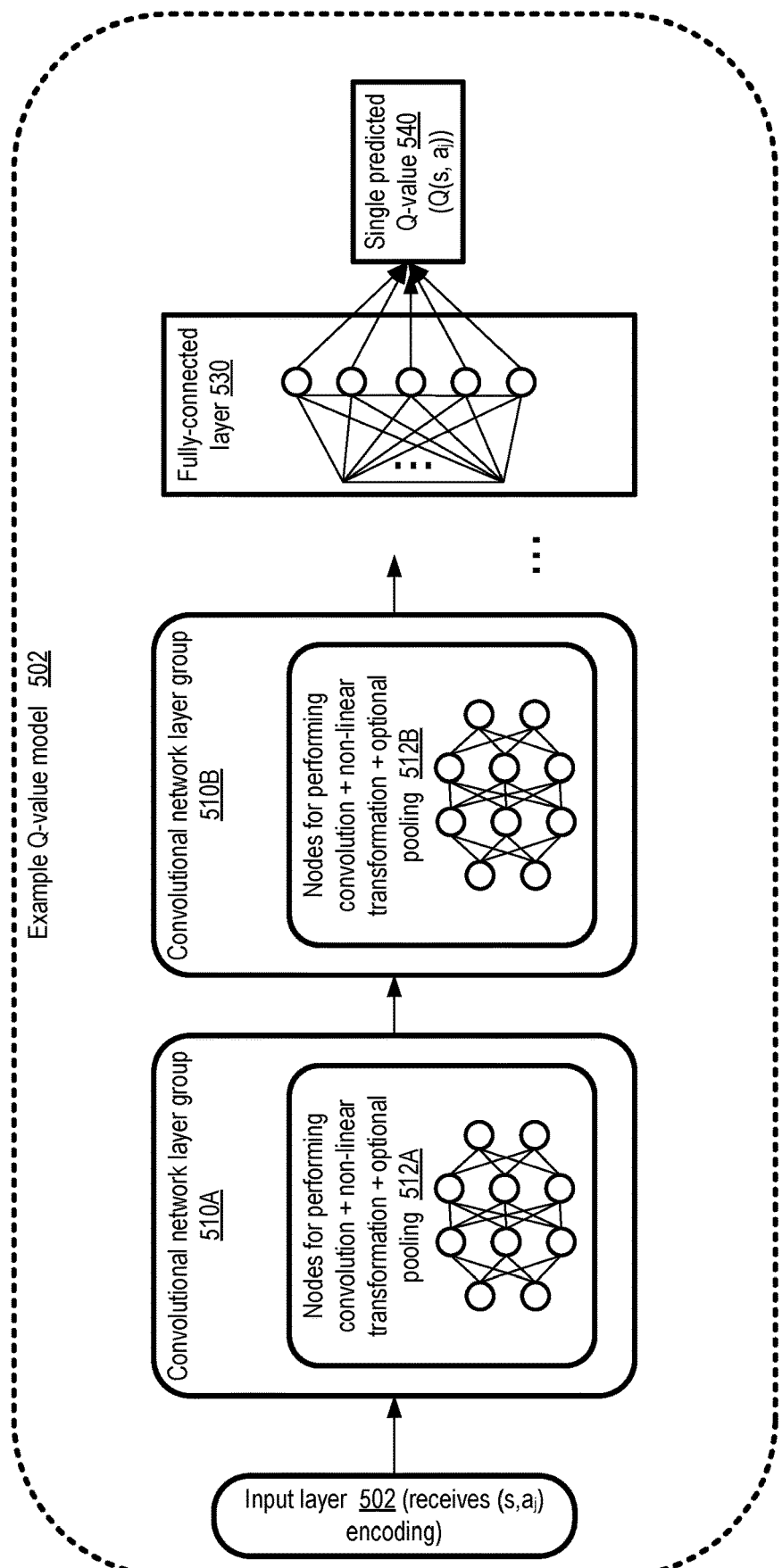
FIG. 5 illustrates an example neural network architecture which may be used to generate value metrics for respective encodings of state and action combinations, according to at least some embodiments.

FIG. 5 illustrates an example neural network architecture which may be used to generate value metrics for respective encodings of state and action combinations, according to at least some embodiments. A convolutional neural network is illustrated by way of example, comprising an input layer 502 to which an encoding of (state, action) combinations denoted as (s, $a_j$) may be provided, one or more convolutional network layer groups 510 such as 510A and 510B, and a fully-connected layer 530 at which a single Q-value 540 denoted as Q(s, $a_j$) associated with a particular action $a_j$ may be generated. Values of various weights, biases and/or other parameters at the different layers may be adjusted using back-propagation during the training phase of the model. The encoding of (s, $a_j$) may comprise, for example, an A×B collections of pixels representing an approximate bird's eye view of the environment, with various aspects of an action or state being encoded using respective colors, icons and/or other graphical elements as discussed earlier, and/or using non-graphical elements. In some embodiments, the behavior planner or some other subcomponent of the decision making system of the vehicle may be responsible for generating the encodings. In at least some embodiments, two separate data objects may be generated, one to encode the state information and one to encode action information. To obtain Q-values for several different feasible actions Q(s, $a_j$), where j=1 . . . N, respective instances of the Q-value model 502 may be executed in different embodiments.

In the depicted embodiment, each convolutional layer group 510 may comprise a set of nodes 512 (artificial neurons) configured to compute convolutions, in some cases including a non-linear transformation. In addition to the computations associated with one or more convolution operations, in some embodiments a given layer group 510 may comprise pooling-related computations at an optional pooling layer. As shown in FIG. 5, in various embodiments, multiple layer groups 510 may be arranged in sequence, with the output of one layer group such as 510A being consumed as input by the next layer group such as 510B. In some embodiments, a different arrangement of convolutional layers, non-linear transformation layers such as rectifying linear units (ReLUs), pooling layers, and/or fully-connected layers may be used—e.g., a sequence of layers similar to the following may be used: Convolution(layer #1)-ReLU(#2)-Convolution(#3)-ReLU(#4)-Pooling(#5)-Convolution(#6)-ReLU(#7)-Convolution(#8)-ReLU(#9)-Pooling(#10)-Fully-Connected(#11). As discussed below in further detail, in some embodiments Q(s, $a_j$) may be computed using two separate neural network pathways, one for estimating state values only and one for estimating the advantages associated with respective feasible actions. In some embodiments, other types of deep neural networks which may not necessarily include convolution layers may be employed.

Figure 6:
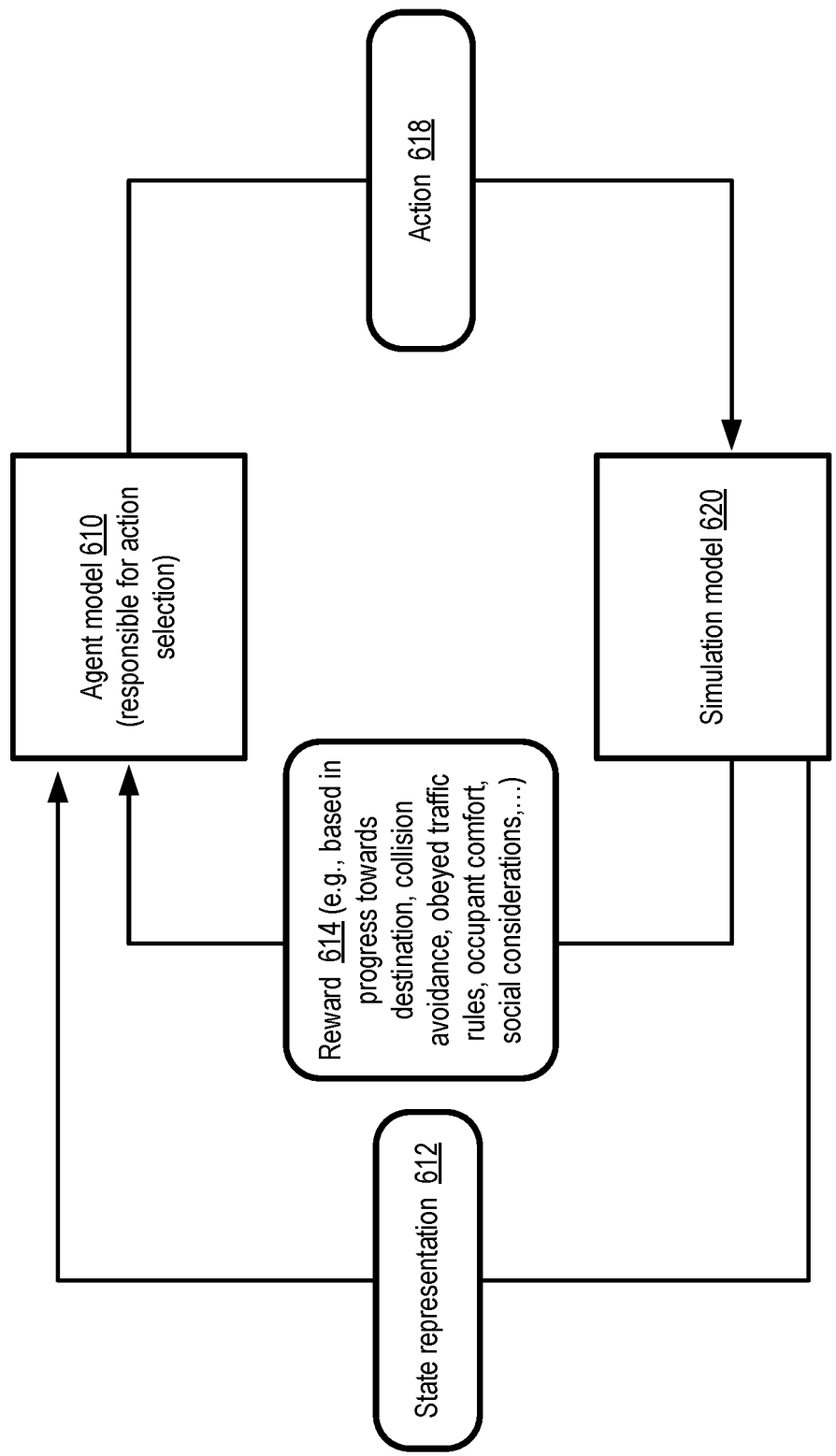
FIG. 6 illustrates a high-level overview of the training of a reinforcement learning model to be used to evaluate varying-size action spaces, according to at least some embodiments.

FIG. 6 illustrates a high-level overview of the training of a reinforcement learning model to be used to evaluate varying-size action spaces, according to at least some embodiments. As shown, in the depicted embodiment the training procedure may comprise a plurality of iterations. In a given iteration, a particular action 618 may be selected by an agent model 610 (e.g., implemented using neural networks) from among a set of feasible actions identified with respect to a current state representation 612. A simulation model 620 may be used to generate the representation of the next state, based on the current state and the action that was implemented in the current state.

As shown, the simulation model 620 may also indicate various parameters or elements of a reward function 614 which may be used to assign values to the attained states and the corresponding actions in the depicted embodiment. The reward associated with a given state or (state, action) sequence may be based on a set of parameters that include, for example, the progress made towards the destination of the journey in progress, the probability of avoiding a collision, the extent to which a set of applicable traffic rules is obeyed by the vehicle, a comfort level of one or more occupants of the vehicle, and/or an anticipated social interaction of an occupant of the first vehicle with one or more individuals outside the first vehicle. For example, if a particular action (such as suddenly switching a lane to move in front of another vehicle, or passing a bicycle with a very small clearance) is likely to induce negative feelings or negative social reactions among individuals outside (or inside) the vehicle, a lower reward value may be associated with that action and the resulting state (all other factors being equal) than to a state resulting from another action which is less likely to induce negative feelings. In various embodiments, the simulation model 612 may be trained at least in part on recorded observations obtained from a large number of real-world journeys of autonomous or non-autonomous vehicles. Training iterations of the form indicated in FIG. 6 may be performed in various embodiments until a convergence criterion is met—e.g., until the action selected in various scenarios by the agent model during the course of a journey results in near-optimal reward function values. After the training is complete, the trained agent model may be deployed as the evaluation model to a fleet of vehicles. In some embodiments, the evaluation model(s) deployed to the fleet may comprise elements or all of the simulation model as well as the agent model.

Figure 7:
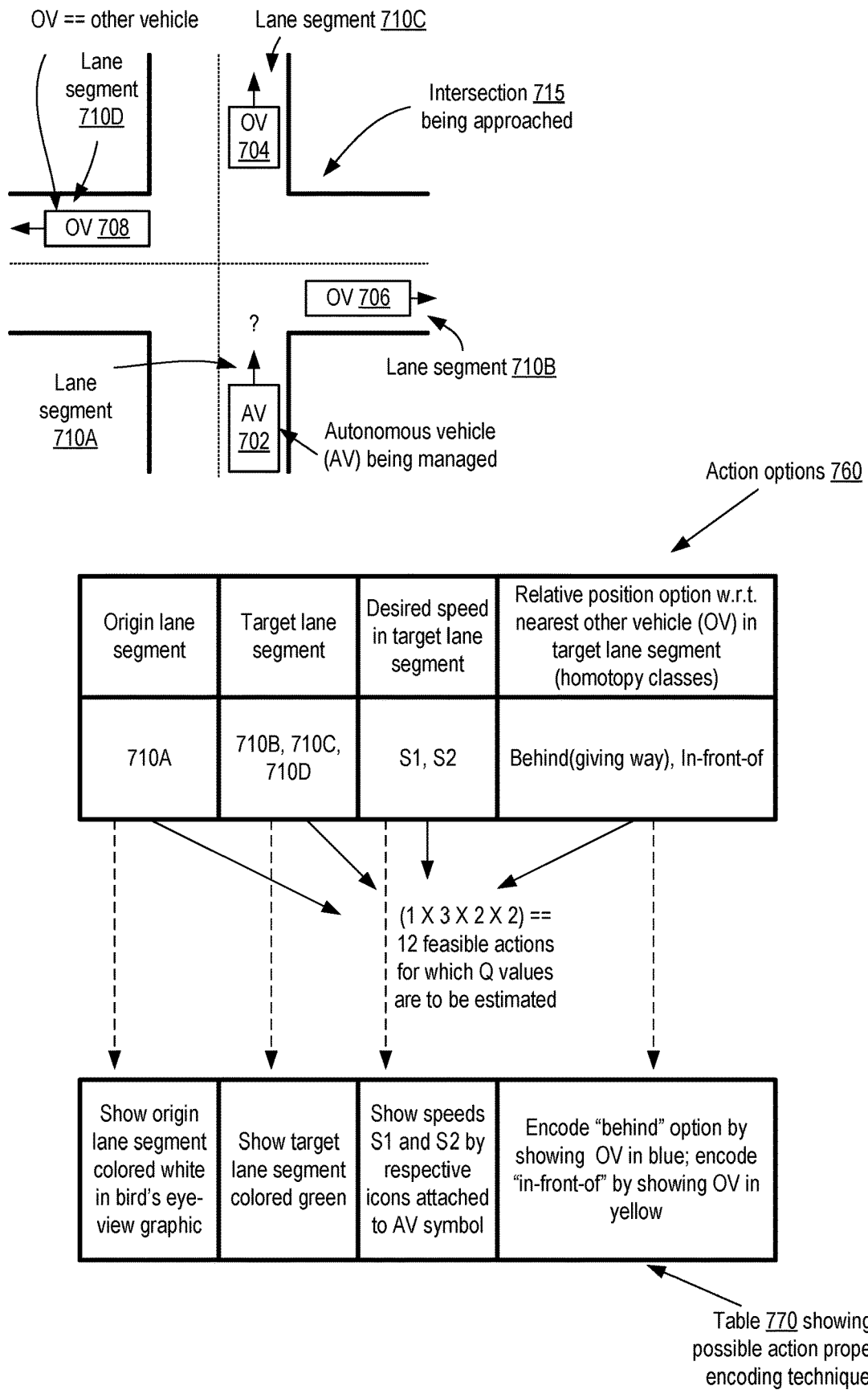
FIG. 7 and FIG. 8 illustrate respective examples of different sizes of action spaces which may be evaluated for a vehicle approaching an intersection, according to at least some embodiments.
Figure 8:
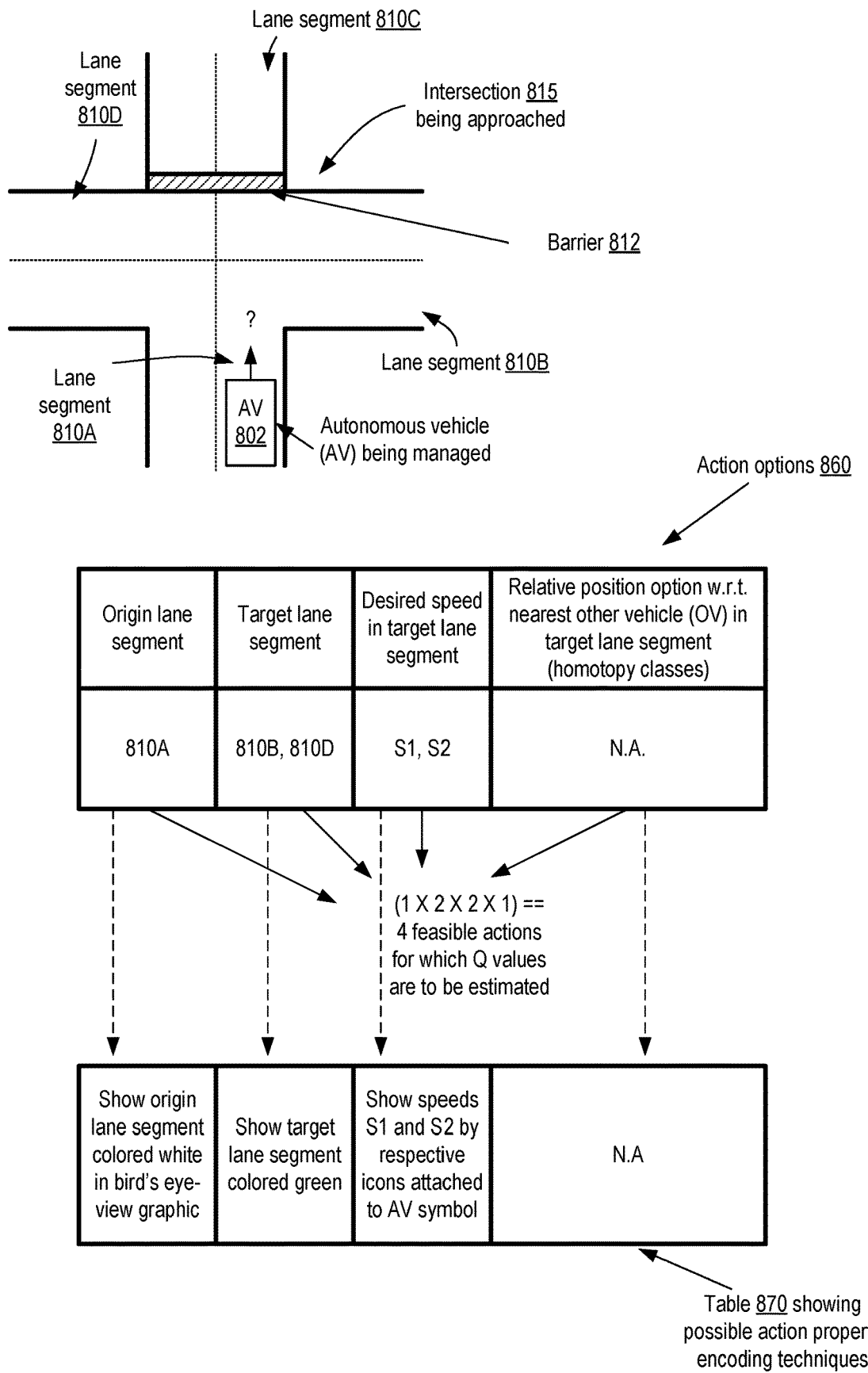

FIG. 7 and FIG. 8 illustrate respective examples of different sizes of action spaces which may be evaluated for a vehicle approaching an intersection, according to at least some embodiments. In the example scenario shown in FIG. 7, motion-related decisions are to be made for an autonomous vehicle (AV) 702 approaching intersection 715 from lane segment 710A.

Action options table 760 indicates possible values of four example action attributes for AV 702 as it approaches intersection 715. The current or origin lane segment of AV 702 is 710A. There are three possible target lane segments to be considered for AV 702 (assuming that AV 702 is not going to move backwards or stop): lane segment 710B (which involves a turn to the right by AV 702), lane segment 710D (which involves a turn to the left), and lane segment 710C (which involves moving forward without any turns by AV 702). In any given target lane segment, two possible speeds S1 and S2 of AV 702 are to be evaluated in the depicted example.

In the example scenario depicted in FIG. 7, other vehicles (OVs) are present and moving in each of the three possible target lane segments. OV 706 is in lane segment 710B, OV 704 is in lane segment 710C, and OV 708 is in lane segment 710D. With respect to each of the OVs, a decision regarding a relative position option of AV 702 may have to be made. As shown in table 760, AV 702 may be positioned behind the OV in its target lane segment (e.g., as a result of AV 702 giving right-of-way to the OV), or AV 702 may be positioned in front of the OV. While a number of distinct trajectories may be implemented for AV 702 while it is behind OV 704 in lane segment 710C, for example, it may not be possible for AV 702 to transition immediately or smoothly from one of these trajectories to another trajectory in which AV 702 is ahead of OV 704. As a result, the two different positional options (behind, or ahead, with respect to a given OV) may be said to represent distinct homotopy classes in various embodiments.

The cardinality of the set of feasible actions to be evaluated in the depicted example scenario may be obtained as the cross-product of the number of choices for each attribute. Thus, there may be a total of 12 feasible actions for AV 702. For encoding or representing each of the different attributes or dimensions of the actions, a respective graphical signal may be used in the depicted embodiment (in other embodiments, non-graphical elements may be used to represent at least some attributes in the inputs provided to the machine learning models). For example, in a bird's eye view graphical or visual representation, as indicated in table 770, the origin lane segment may be colored white, the target lane segment may be colored green, the speeds may be indicated by respective icons, and the positional options may be indicated by a color assigned to the graphical representation of the OV in the depicted embodiment. The encodings of combinations of the state and the 12 different feasible actions may be provided as input, for example, to respective instances of a reinforcement learning model to obtain value estimates for the actions as discussed earlier. It is noted that the example action attributes or dimensions shown in FIG. 7 are not intended to be restrictive; other combinations of action attributes may be encoded in various embodiments as discussed below in further detail with respect to FIG. 9.

In the example scenario depicted in FIG. 8, the state of the vehicle 802, which is also approaching an intersection 815 similar to the intersection 715 being approached in FIG. 7, differs from the state of vehicle 702 of FIG. 7 in several aspects. First, there is a barrier 812 which prevents AV 802 from proceeding forward through the intersection; as a result, a decision is required as to whether a right turn or a left turn is to be made, and forward progress without turning is not possible. Secondly, there are no other vehicles with respect to which decisions regarding relative positions have to be made. As a result of these differences in the state of the AV 802 (relative to the state of AV 702 indicated in FIG. 7), the size of the action space to be evaluated is smaller in the example scenario shown in FIG. 8 (relative to the size of the action space considered in FIG. 7).

As shown in action options table 860, there are a total of four actions to be considered: the cross product of the target lane segment choices 810B and 810D with the speed options S1 and S2. A similar approach towards the encoding of the different attributes of the actions to that illustrated in FIG. 7 may be taken in the scenario depicted in FIG. 8. Because the number of feasible actions to be evaluated is smaller, fewer instances of the machine learning model being used to generate value metrics for the different (state, action) combinations may be executed in the example scenario depicted in FIG. 8, than the number of instances which may have been executed in the example scenario depicted in FIG. 7. This flexible approach, in which the number of times the value-estimating machine learning model is run (at least in some cases in parallel, e.g., using GPUs) is adjusted dynamically as the size of the action space changes, may help simplify the design of the decision making components of the vehicle considerably, e.g., relative to designs in which the machine learning model used for evaluating actions has to be trained with the total number of actions assumed to be known in advance.

Figure 9:
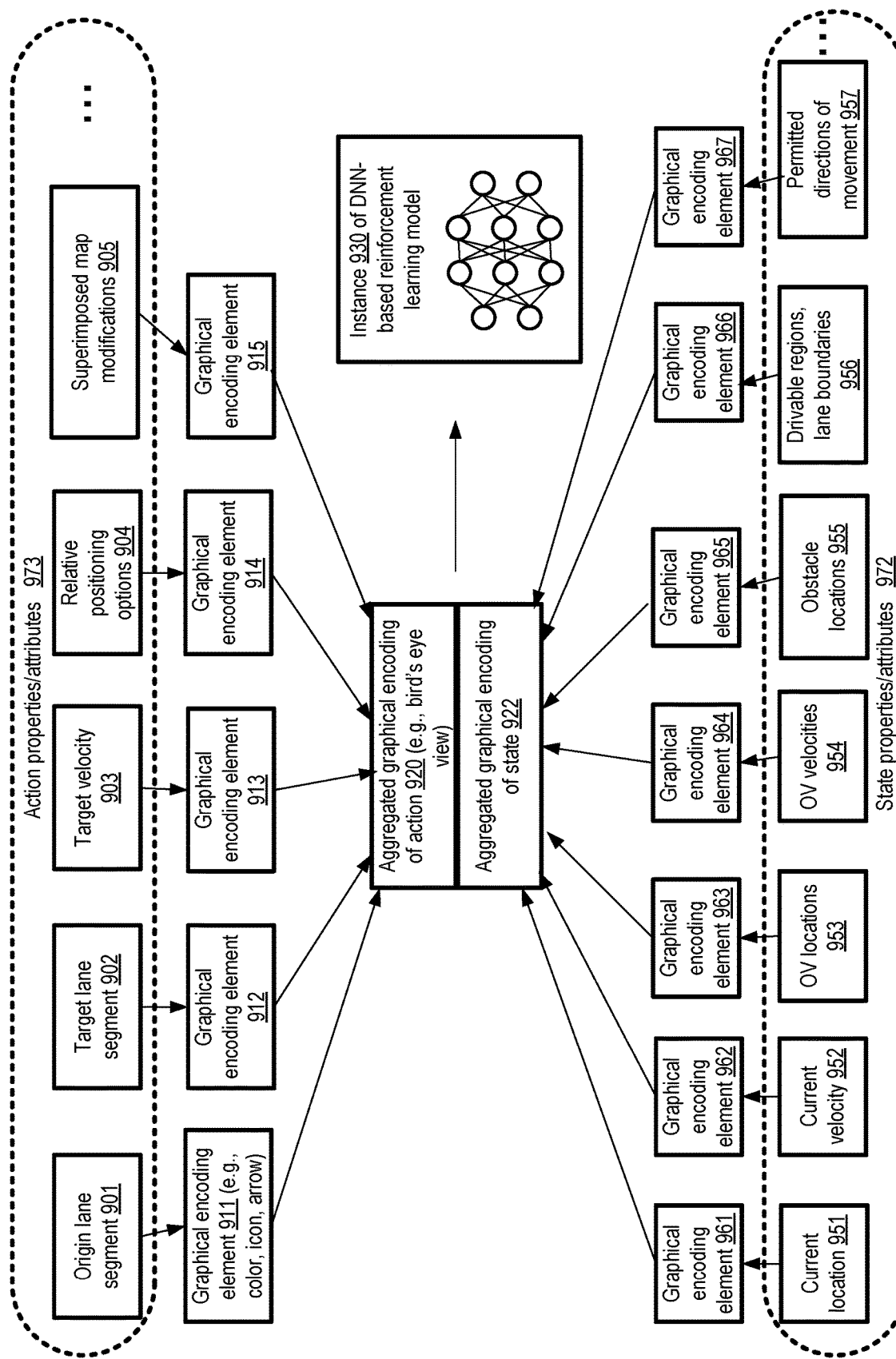
FIG. 9 illustrates examples of state and action properties or attributes for which respective elements may be identified for including in encodings used as input to a reinforcement learning model, according to at least some embodiments.

FIG. 9 illustrates examples of state and action properties or attributes for which respective elements may be identified for including in encodings used as input to a reinforcement learning model, according to at least some embodiments. With respect to a given feasible action, the set of attributes or properties 973 to be represented in the encodings may include, for example, the origin or current lane segment 901, the target lane segment 902, the target velocity or speed 903, relative positioning options 904 with respect to one or more other vehicles in the target lane segment, as well as optional superimposed map modifications in the trajectory 905 in the depicted embodiment. As mentioned earlier, the relative positioning options 904 may, for example represent homotopy classes, such as whether the vehicle for which actions are being analyzed is to give the right of way to the other vehicle and thereby be positioned behind the other vehicle, or whether the other vehicle should be passed. The superimposed map modifications 905 may include, for example, insertions by the decision making components of artificial elements such as stopping positions in one or more of the lane segments being traversed by the vehicle (even when the physical environment of the vehicle does not involve corresponding real elements such as a stop sign). Such superimposed map modifications 905 may be generated by decision making components such as behavior planners, for example, based on the analysis of records of actual drivers or simulated drives in similar conditions to the current state in some embodiments.

With respect to the current state of the vehicle, the set of properties/attributes 972 considered for encoding may include, for example, the current location 951 of the vehicle, the current velocity 952, the locations of any other vehicles 953 in the vicinity of the current location, the velocities 954 of the other vehicles, locations 955 of stationary or moving obstacles, drivable regions and lane boundaries 956, permitted directions 957 of movement of the vehicle in various lane segments, and so on in the depicted embodiment. Values of some of these attributes may be determined based on processing of sensor data collected at the vehicle, while other attribute values may be based at least in part on map information which may have been downloaded to the vehicle in various embodiments. Other combinations of attributes or properties for states and/or actions may be captured and encoded in different embodiments; at least in some embodiments, not all the properties shown in FIG. 9 may be used.

Corresponding to each of the attributes of an action and the state, respective graphical encoding elements (such as elements 911-915 for the action attributes, and elements 961-967 for state attributes) may be selected in the depicted embodiment. The graphical elements, which may also be referred to as channels, may comprise, for example, the use of distinct colors, icons etc. used to represent the different attributes in an approximate bird's eye view of the environment of the vehicle in some embodiments. From the various graphical elements, an aggregated graphical action encoding 920 and an aggregated graphical state encoding 922 may be generated in the depicted embodiment. The aggregated encodings 920 and 922 of the (state, action) combination may be provided as input to an instance 930 of a DNN-based reinforcement learning vehicle in at least some embodiments. In some embodiments, as mentioned earlier, other types of encodings or representations may be used—e.g., the state and action attributes information may be combined into a single representation, or non-graphical encodings may be generated.

Figure 10:
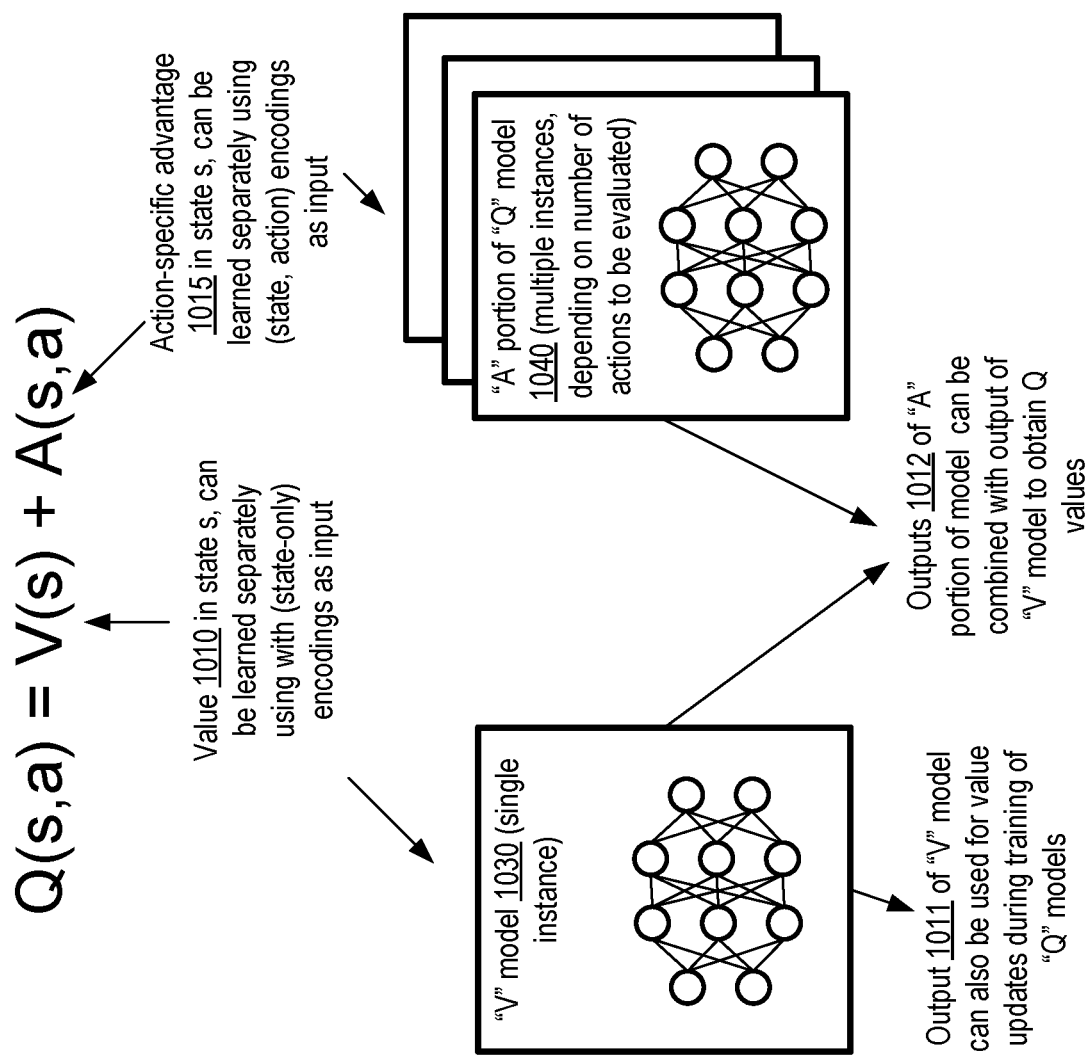
FIG. 10 illustrates an overview of a technique in which two types of neural network models, one of which uses state-only encodings as input, may be employed in combination for estimating values associated with actions in a given state, according to at least some embodiments.

As discussed earlier, in various embodiments, instances of a single DNN model which maps (state, action) or (s, a) combinations into respective Q(s, a) quality metrics estimates may be used. In some embodiments, the computation of the quality metrics may be performed using a different approach involving more than one type of DNN model. FIG. 10 illustrates an overview of a technique in which two types of neural network models, one of which uses state-only encodings as input, may be employed in combination for estimating values associated with actions in a given state, according to at least some embodiments.

In the depicted embodiment, the quality metric Q(s, a) for a given state and action of an agent (such as a decision-making subsystem of an autonomous vehicle) may be formulated as the sum of two terms: a state-specific value term V(s) and an action-specific advantage term A(s, a). The agent is assumed to behave according to a stochastic policy—in effect, a set of rules for choosing a given action for implementation from among a set of feasible actions in a given state. Intuitively, the value function V(s) measures how good it is for the agent to be in a particular state; Q(s, a) indicates the value of choosing a particular action in the particular state); and A(s, a) represents the relative importance or contribution of the particular action.

According to the split formulation for Q(s, a) shown in FIG. 10, a single instance of a V model 1030 (which may be referred to as a V network) may be sufficient to obtain the value V(s) 1010 in state s, with only state information being included in the input to the V model. In contrast, if there are multiple feasible actions to consider, multiple instances 1040 of the A portion (referred to as an A network) of a Q model may be executed (which take both state and action encodings as input) to compute action-specific advantage values 1015 for the different feasible actions in at least some embodiments.

In at least one embodiment, the ability to generate the V(s) values using a single instance of a DNN model may help to simplify or shorten the training time of the models used for Q(s, a) estimations. For example, in a simplified representation, the value iteration update that is used in learning Q(s, a) values may be formulated as follows:

$$Q(s_t, a_t) \leftarrow Q(s_t, a_t) + \alpha \cdot (r_t + \gamma \cdot \max_a Q(s_{t+1}, a) - Q(s_t, a_t)) \quad (2)$$

In formulation (2), $\alpha$ represents the learning rate, $r_t$ is the reward at some time step t, $\gamma$ is the discount factor, and $\max_a Q(s_{t+1}, a)$ is the estimate of optimal future value. By definition, a model for V(s) would learn to output the same value as $\max_a Q(s, a)$. The V(s) model may have to be executed just once to obtain the estimated optimal future value, and this fact may be used to reduce the overall amount of computation required for training iterations of the Q model in various embodiments.

As indicated in FIG. 10, the outputs 1012 of the A portion of the models (with one instance being run for each action being evaluated) may be combined with the output of the V model to obtain the Q values for the different (s, a) combinations in the depicted embodiment. In some embodiments, for example, the outputs of an A network and the "V" network may be provided as input to a combining layer of artificial neurons, and the combining layer may produce Q values as its output.

In at least some embodiments, the outputs of the V models may be used to evaluate one or more nodes of a tree of nodes representing respective future vehicle states. The V models may be used in this way, for example, during planning tree processing similar to that discussed in the context of FIG. 4. In some embodiments, the approach of using separate V and A portions of DNN models may be more efficient (in terms of the total computation required) than the approach of using unified Q DNNs.

Figure 11:
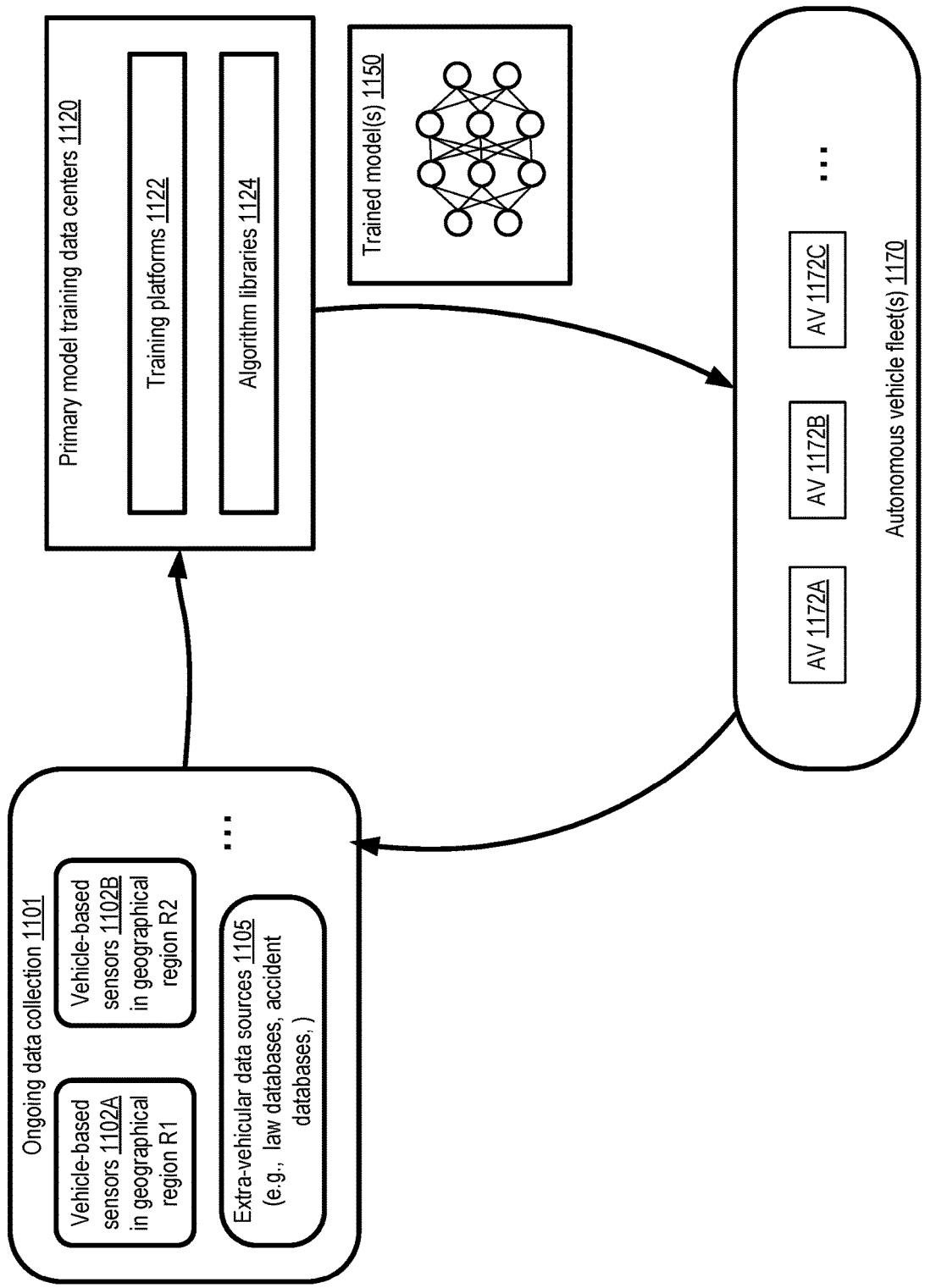
FIG. 11 illustrates an overview of example stages of developing, deploying and using machine learning models for autonomous vehicles, according to at least some embodiments.

FIG. 11 illustrates an overview of example stages of developing, deploying and using machine learning models for autonomous vehicles, according to at least some embodiments. As shown, as part of a continuous or ongoing data collection procedure 1101, data about driving environments may be collected from a variety of vehicle-based sensors in numerous geographical regions such as R1 and R2. The set of sensors at a given vehicle may comprise, among others, externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices, sensors associated with vehicle motion-control subsystems such as brakes, accelerator pedals, steering wheels, and so on. In addition to conventional video and/or still cameras, in some embodiment near-infrared cameras and/or depth cameras may be used. The raw sensor data may be transformed into higher level abstractions or objects prior to further analysis in at least some embodiments, e.g., using one or more perception subsystems. In addition to the vehicle sensors, data about driving environments may also be collected from extra-vehicular data sources 1105 in at least some embodiments. Such data sources may include, for example, databases of traffic laws, accident reports, mapping services and the like.

The data may be aggregated at one or more primary model training data centers 1120 in the depicted embodiment. The data centers may comprise numerous computing platforms, storage platforms and the like, from which some number of training platforms 1122 may be selected to train and evaluate neural network-based models 1150 using any of a variety of machine learning algorithms of a library 1124 (e.g., including algorithms which rely on simulations of driver behavior and/or autonomous vehicle behavior as discussed earlier). Trained models 1150, which may for example the types of DNN-based reinforcement learning models discussed earlier, may be transmitted to autonomous vehicles 1172 (e.g., AV 1172A-1172C) of fleets 1170 in the depicted embodiment. The trained models may be executed using local computing resources at the autonomous vehicle and data collected by local sensors of the autonomous vehicles, e.g., to predict vehicle environment states, evaluate and select actions, generate motion control directives to achieve vehicle trajectories which meet safety, efficiency and other desired criteria, and so on. At least a subset of the decisions made at the vehicle, as well as the local sensor data collected, may be transmitted back to the data centers as part of the ongoing data collection approach, and uses to improve and update the models in various embodiments. In some embodiments, updated versions of the models may be transmitted to the autonomous vehicle fleet from the data centers periodically, e.g., as improvements in the model accuracy and/or efficiency are achieved. In at least one embodiment, respective versions of models may be generated for several sub-domains—e.g., one model may be generated for large trucks, another for passenger cars, and so on, and the appropriate models may be transmitted to autonomous vehicles of different types. Similarly, in some embodiments, geography-specific models may be generated and transmitted to autonomous vehicles for execution in the corresponding regions or countries.

Figure 12:
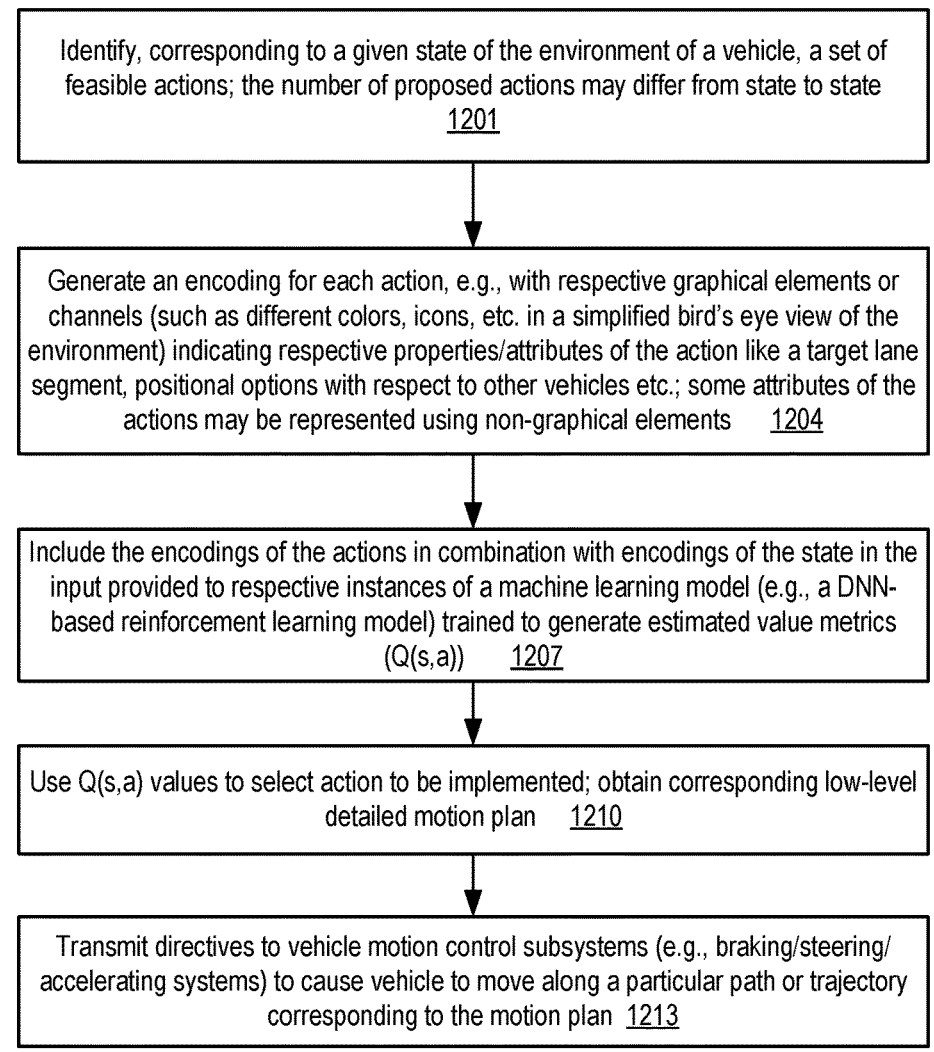
FIG. 12 is a flow diagram illustrating aspects of operations which may be performed to evaluate varying-size action spaces of an autonomous vehicle using reinforcement learning models, according to at least some embodiments.

FIG. 12 is a flow diagram illustrating aspects of operations which may be performed to evaluate varying-size action spaces of an autonomous vehicle using reinforcement learning models, according to at least some embodiments. As shown in element 1201, corresponding to a given state of the environment of the vehicle, a set of feasible actions may be identified in the depicted embodiment. The state and actions may, for example, be identified by a decision-making component of the vehicle's on-board computing devices, such as a behavior planner, based at least in part on data collected by the vehicles sensors, maps, etc. The set of actions may be state-dependent in various embodiments—that is, the number of feasible actions may differ from one state to another, depending for example on the number of other vehicles which happen to be in the vicinity of the autonomous vehicle.

A respective encoding may be generated for each action, e.g., with distinct graphical elements or channels (such as different colors, icons, etc. in a simplified bird's eye view of the environment) indicating respective properties/attributes of the action like a target lane segment, positional options with respect to other vehicles, and so on (element 1204). A similar multi-channel or multi-element encoding may be generated for the current state in the depicted embodiment. In some embodiments, non-graphical representations such as scalar values, may be generated or identified for inclusion in the inputs to machine learning model instances.

For individual ones of the actions, encodings of the combination of the action and the state may be provided as input (e.g., together with any non-graphical elements being used to represent attributes of the states or actions) to a respective instance of a machine learning model (e.g., a deep neural network-based reinforcement learning model) trained to generate estimated value metrics (Q(s, a)) for the combination (element 1207). The same model may be used (with different counts of instances) as the size of the action space to be evaluate changes, thereby simplifying the design and implementation of the decision making components of the vehicle. In some embodiments, the vehicle may be equipped with GPU-based computing platforms and/or other computing platforms that are optimized for parallel execution of machine learning models, and such platforms may be used to shorten the total time taken for all the instances to be executed.

The value metrics estimated for the different (state, action) combinations may be used to select a particular action to be implemented (element 1210) in various embodiments. The relatively high-level attributes of the action may be translated into a more details motion plan. Directives corresponding to the low-level motion plan may be transmitted to one or more motion control subsystems (e.g., braking, steering, or turning subsystems) to cause the vehicle to move along a particular path or trajectory in accordance with the motion plan and the selected action (element 1213) in the depicted embodiment. As the trajectory is implemented, the state of the vehicle may change, and the operations corresponding to elements 1201-1213 may be repeated for the new state (which may have a different number of feasible/proposed actions), until eventually the journey of the vehicle ends.

It is noted that in various embodiments, at least some operations other than those illustrated in the flow diagram of FIG. 12 may be used to implement the techniques for evaluating action spaces of varying sizes described above. Some of the operations shown may not be implemented in some embodiments or may be implemented in a different order, or in parallel rather than sequentially.

In some embodiments, computations of the modeling and analysis components associated with an autonomous vehicle may be performed in a distributed manner, e.g., using local resources located in the vehicle itself as well as remote resources. A remote data center may comprise, for example, one or more pools of compute resources, such as virtual or physical servers. In some embodiments, at least some resource pools or individual servers of a data center may be optimized for performing machine learning operations— e.g., some servers may use graphical processing units more suitable for neural network algorithms than conventional CPUs. The resources of the data center may be used to train and run at least some of the machine learning models (including for example the kinds of deep neural networks discussed above) used by the local decision making components of the autonomous vehicles; thus, the decision making components in effect may comprise some on-board components local to the vehicles and some remote components in some embodiments. The data center may also store one or more databases (e.g., comprising tactical maps, local regulations, and the like for some area or region) in some embodiments.

A given autonomous vehicle may comprise a respective set of on-board computing resources, as well as a respective dynamically-updated local cache in some embodiments. Depending for example on the current location of a vehicle and/or the identities of the current occupants, the caches may be updated periodically from a data center's databases. For example, city-specific or neighborhood-specific traffic rules may be loaded into the caches as needed, occupant preferences (such as the relative weights to be assigned to different factors when selecting actions to be taken) may be updated when occupants change, and so on. It is noted that not all the autonomous vehicles may incorporate equivalent local computing resources—e.g., some vehicle models may contain more powerful processing devices and/or larger caches than others.

Based at least in part on the quality of the network connectivity between the autonomous vehicles and the data center, different relative amounts of motion decision-related processing may be performed locally using on-board resources versus remotely in various embodiments. In general, the autonomous vehicles may attempt to establish and maintain high-bandwidth and low-latency communication channels with the data center. If the quality of the connectivity is high, data may be transmissible at a high rate and with high fidelity to/from the data center, and as a result a larger fraction of the computations needed for vehicle motion-related decisions, may be performed at the data center. In contrast, if the connectivity is of lower quality, a larger fraction of the decision-making logic may have to be implemented using on-board resources. In at least one embodiment, the tasks of collecting and processing sensor data, and the motion selector's operations, may be performed using local computing resources, while it may be possible (although not required) to perform at least a fraction of higher-level state prediction functions and/or behavior planner functions at the data center. In various embodiments, because of the possibility of poor connectivity with the remote data center, the decision-making components of the vehicle may be designed such that they are capable of planning the vehicle's movements appropriately and safely even if communications with the data center are not feasible for extended periods of time.

Figure 13:
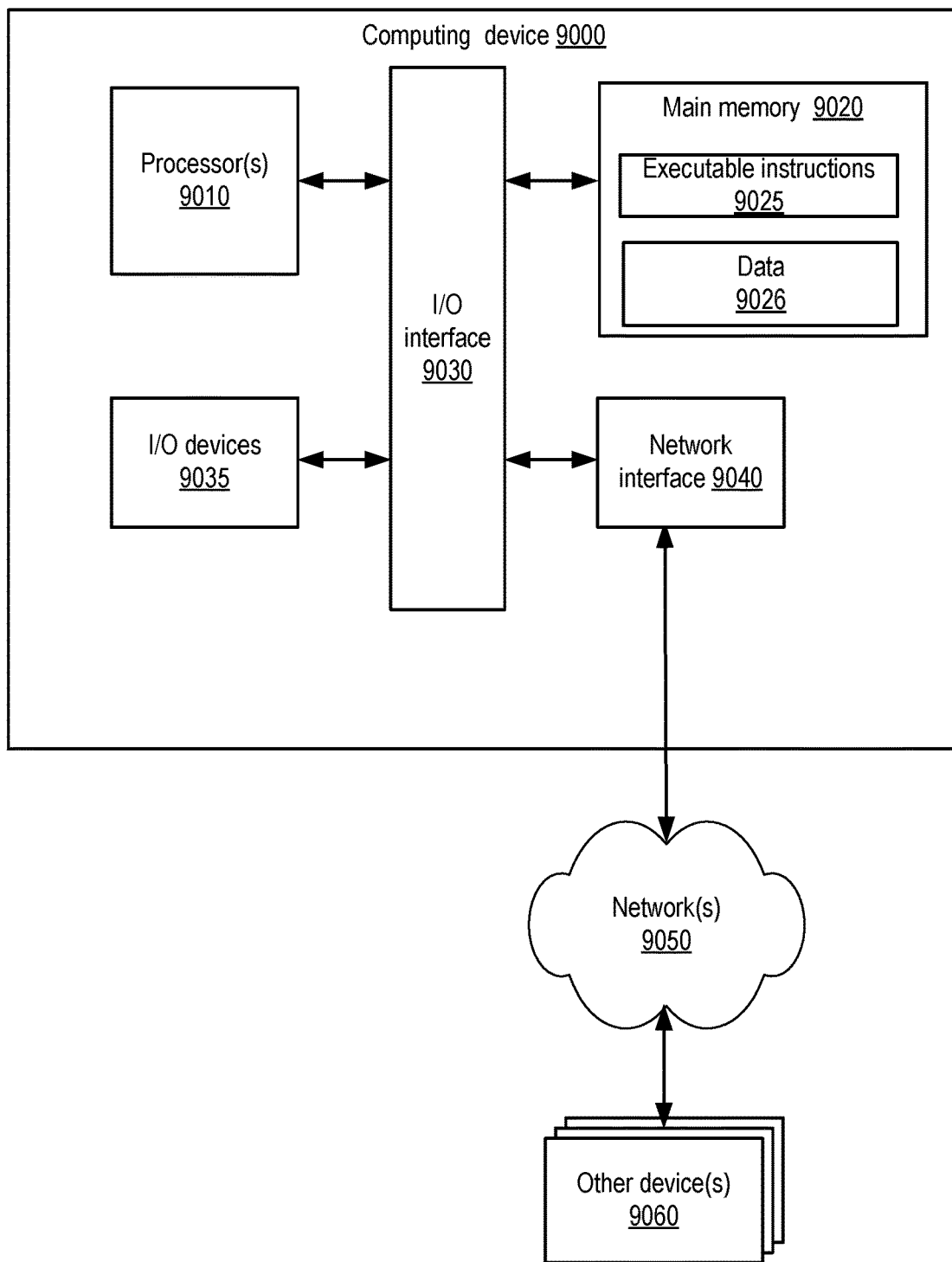
FIG. 13 is a block diagram illustrating an example computing device that may be used in at least some embodiments.

In at least some embodiments, a server that implements a portion or all of one or more of the techniques for evaluating varying-sized action spaces described herein, including the techniques to collect, obtain or process sensor signals of various types, to generate encodings of actions and states, to train and execute machine learning algorithms including neural network algorithms and the like, may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13, and/or multiple storage media may be used to implement the described functionality in various embodiments; for example, software components running on a variety of different devices and servers using one or more processors may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, at one or more computing devices:
      identifying, corresponding to a first state of an environment of a first vehicle, a first set of actions, wherein a first action of the first set indicates a first target lane segment and a first relative positioning option with respect to another moving entity of the environment, and wherein a second action of the first set indicates a second target lane segment;
      generating a first encoding of the first action, and a second encoding of the second action, wherein in the first encoding, the first target lane segment is indicated at least in part by a first color;
      determining, using a plurality of instances of a first machine learning model, a respective estimated value metric associated with individual actions of the first set, wherein an input data set of a first instance of the first machine learning model comprises the first encoding, and wherein an input data set of a second instance of the first machine learning model comprises the second encoding; and
      transmitting, to a motion-control subsystem of the first vehicle, one or more motion-control directives to implement a particular action of the first set, wherein the particular action is selected from the first set based at least in part on its estimated value metric.

2. The method as recited in claim 1, further comprising performing, by the one or more computing devices:
   identifying, corresponding to a second state of the environment of a first vehicle, a second set of actions, wherein a number of actions in the second set differs from a number of actions in the first set;
   selecting a particular action of the second set for implementation using at least (a) respective encodings of the actions of the second set and (b) a second plurality of instances of the first machine learning model.

3. The method as recited in claim 1, wherein in the first encoding, respective graphical elements indicate one or more of: (a) the relative positioning option, (b) a target velocity of the first vehicle, (c) a source lane segment of the first vehicle, (d) a velocity modification of the first vehicle, or (e) a pause in a trajectory of the first vehicle.

4. The method as recited in claim 1, wherein the estimated value metric generated by the model is based at least in part on a reward function, wherein a parameter of the reward function comprises an indication of one or more of: (a) progress towards a destination of a journey of the first vehicle, (b) a probability associated with avoidance of a collision of the first vehicle, (c) an extent to which a set of traffic rules is obeyed by the first vehicle, (d) a comfort level of one or more occupants of the first vehicle, or (e) an anticipated social interaction of an occupant of the first vehicle with one or more individuals outside the first vehicle.

5. The method as recited in claim 1, wherein the input data set of the first instance of the first machine learning model comprises an encoding of the first state.

6. The method as recited in claim 5, wherein the encoding of the first state comprises a respective element indicative of one or more of: (a) a location of the first vehicle, (b) a velocity of the first vehicle, (c) respective locations of one or more other moving entities, (d) respective velocities of one or more other moving entities, (e) an obstacle, (f) a drivable region of a road, (g) a lane boundary, or (h) a permitted direction of movement.

7. The method as recited in claim 1, further comprising performing, by the one or more computing devices:
training a second machine learning model to generate a respective estimated value associated with individual states of the environment of a vehicle, wherein an input data set of the second machine learning model comprises an encoding of a particular state; and
utilizing, during a training phase of the first machine learning model, output of the second machine learning model in a value update operation of the first machine learning model.

8. The method as recited in claim 7, further comprising performing, by the one or more computing devices:
utilizing output of the second machine learning model to evaluate one or more nodes of a tree of nodes representing respective future states of the environment of the first vehicle.

9. The method as recited in claim 1, wherein the first machine learning model comprises a neural network-based reinforcement learning model with one or more convolution layers.

10. The method as recited in claim 1, wherein the number of instances of the first machine learning model is based at least in part on a number of actions in the first set of actions.

11. A system, comprising:
one or more computing devices;
wherein the one or more computing devices:
identify, corresponding to a first state of an environment of a first vehicle, a first set of actions, wherein a first action of the first set indicates a first target lane segment and a first relative positioning option with respect to another moving entity of the environment, and wherein a second action of the first set indicates a second target lane segment;
generate a first encoding of the first action, and a second encoding of the second action, wherein in the first encoding, the first target lane segment is indicated at least in part by a first color;
determine, using a plurality of instances of a first machine learning model, a respective estimated value metric associated with individual actions of the first set, wherein an input data set of a first instance of the first machine learning model comprises the first encoding, and wherein an input data set of a second instance of the first machine learning model comprises the second encoding; and
transmit, to a motion-control subsystem of the first vehicle, one or more motion-control directives to implement a particular action of the first set, wherein the particular action is selected from the set based at least in part on its estimated value metric.

12. The system as recited in claim 11, wherein the input data set of the first instance of the first machine learning model comprises an encoding of the first state.

13. The system as recited in claim 11, wherein the one or more computing devices:
determine one or more properties of the first state based at least in part on one or more of: (a) sensor data processed at the first vehicle or (b) map information.

14. The system as recited in claim 11, wherein an execution duration of the first instance of the first machine learning model overlaps at least in part with an execution duration of the second instance of the first machine learning model.

15. The system as recited in claim 14, wherein the first instance of the first machine learning model is executed at least in part using one or more graphical processing units, and wherein the second instance of the first machine learning model is executed at least in part using the one or more graphical processing units.

16. One or more non-transitory computer-accessible storage media storing program instructions that when executed on or across one or more processors cause the one or more processors to:
identify, corresponding to a first state of an environment of a first vehicle, a first set of actions, wherein a first action of the first set indicates a first target lane segment and a first relative positioning option with respect to another moving entity of the environment, and wherein a second action of the first set indicates a second target lane segment;
generate a first encoding of the first action, and a second encoding of the second action, wherein in the first encoding, the first target lane segment is indicated at least in part by a first color;
determine, using a plurality of instances of a first machine learning model, a respective estimated value metric associated with individual actions of the first set, wherein an input data set of a first instance of the first machine learning model comprises the first encoding, and wherein an input data set of a second instance of the first machine learning model comprises the second encoding; and
transmit, to a motion-control subsystem of the first vehicle, one or more motion-control directives to implement a particular action of the first set, wherein the particular action is selected from the set based at least in part on its estimated value metric.

17. The one or more non-transitory computer-accessible storage media as recited in claim 16, wherein the input data set of the first instance of the first machine learning model comprises an encoding of the first state.

18. The one or more non-transitory computer-accessible storage media as recited in claim 16, wherein in the input data set of the first instance, a target velocity of the first vehicle is indicated by a non-graphical scalar value.

19. The one or more non-transitory computer-accessible storage media as recited in claim 16, wherein the estimated value metric generated by the model is based at least in part on a reward function, wherein a parameter of the reward function comprises an indication of one or more of: (a) progress towards a destination of a journey of the first vehicle, (b) a probability associated with avoidance of a collision of the first vehicle, (c) an extent to which a set of traffic rules is obeyed by the first vehicle, (d) a comfort level of one or more occupants of the first vehicle, or (e) an anticipated social interaction of an occupant of the first vehicle with one or more individuals outside the first vehicle.

20. The one or more non-transitory computer-accessible storage media as recited in claim 16, wherein an output data set of the first instance of the first machine learning model comprises an estimated value metric associated with the first action and does not comprise an estimated value metric associated with the second action.

* * * * *